Figure 6:
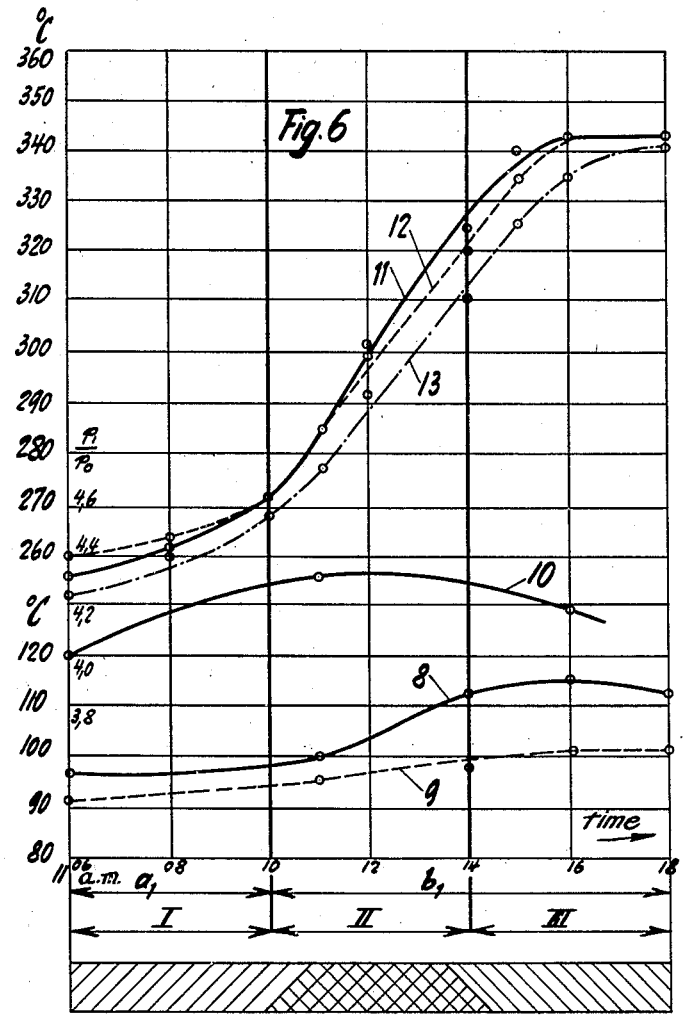

Sept. 27, 1938.　　　　H. HOLZWARTH　　　　2,131,047
METHOD AND APPARATUS FOR CONTROLLING THE IGNITION IN EXPLOSION CHAMBERS
Filed April 21, 1934　　　17 Sheets-Sheet 1
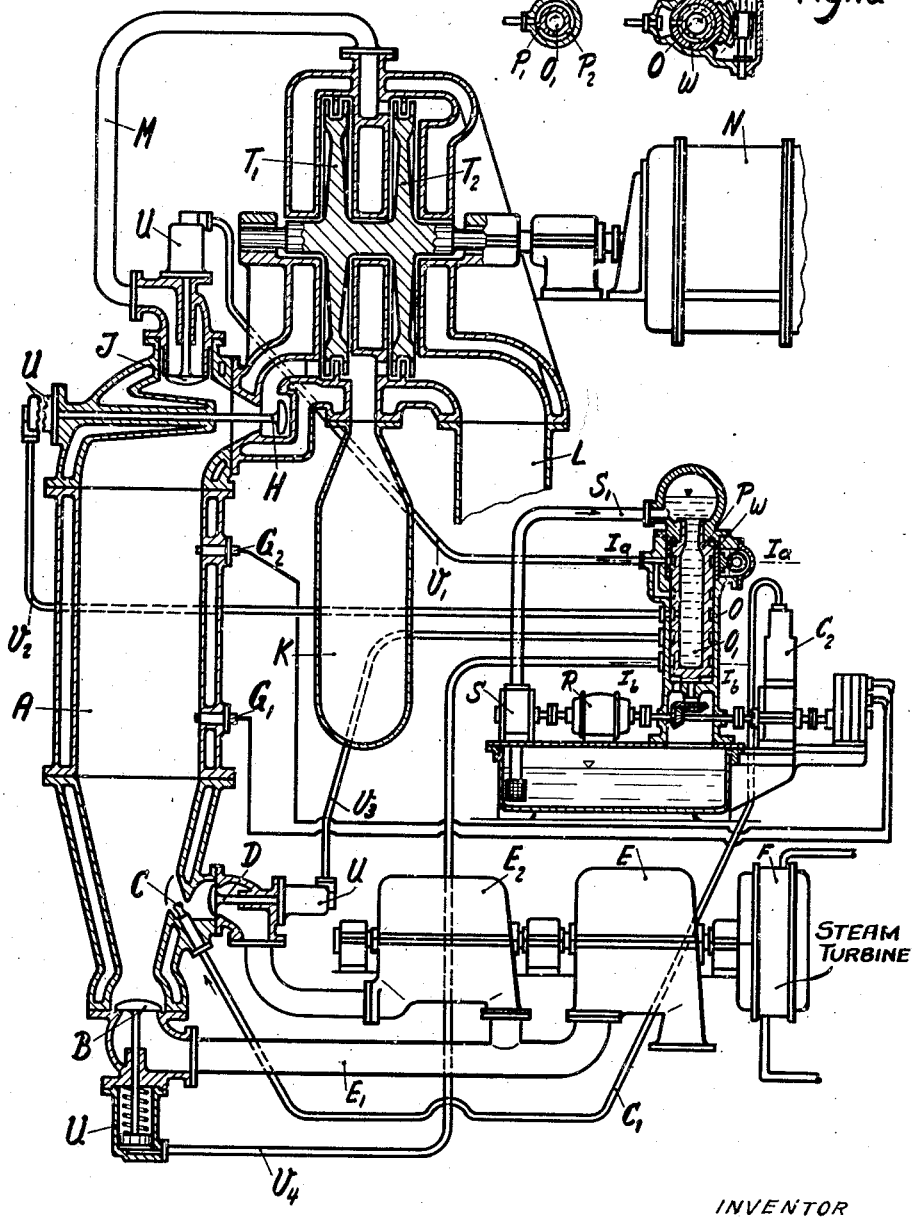
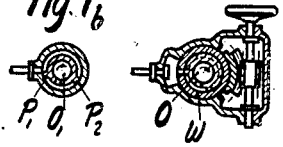
INVENTOR
HANS HOLZWARTH
BY
Joseph Hirschman
ATTORNEY

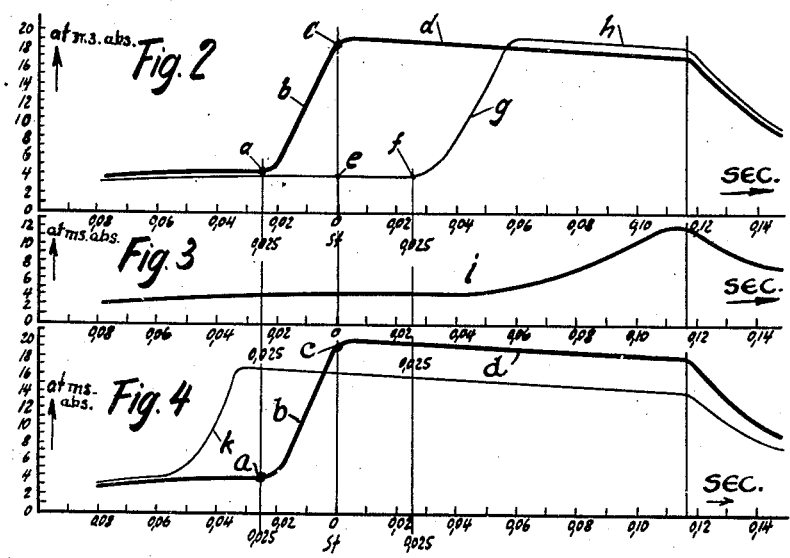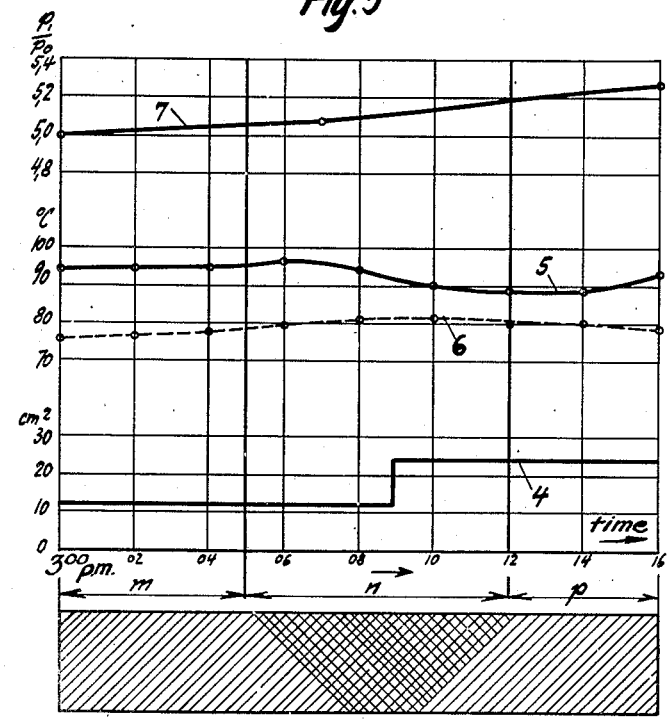

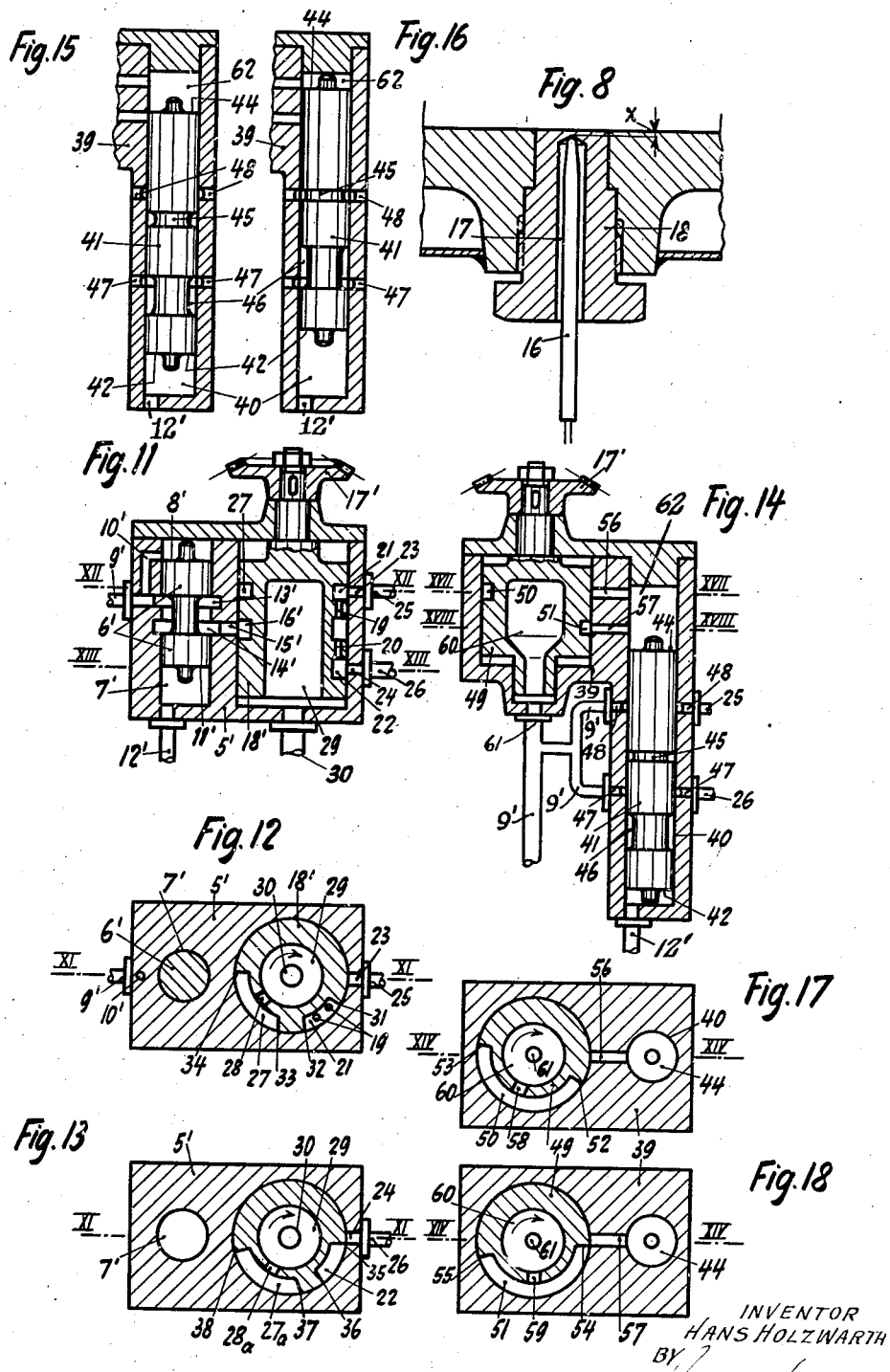

Sept. 27, 1938. H. HOLZWARTH 2,131,047
METHOD AND APPARATUS FOR CONTROLLING THE IGNITION IN EXPLOSION CHAMBERS
Filed April 21, 1934 17 Sheets-Sheet 5
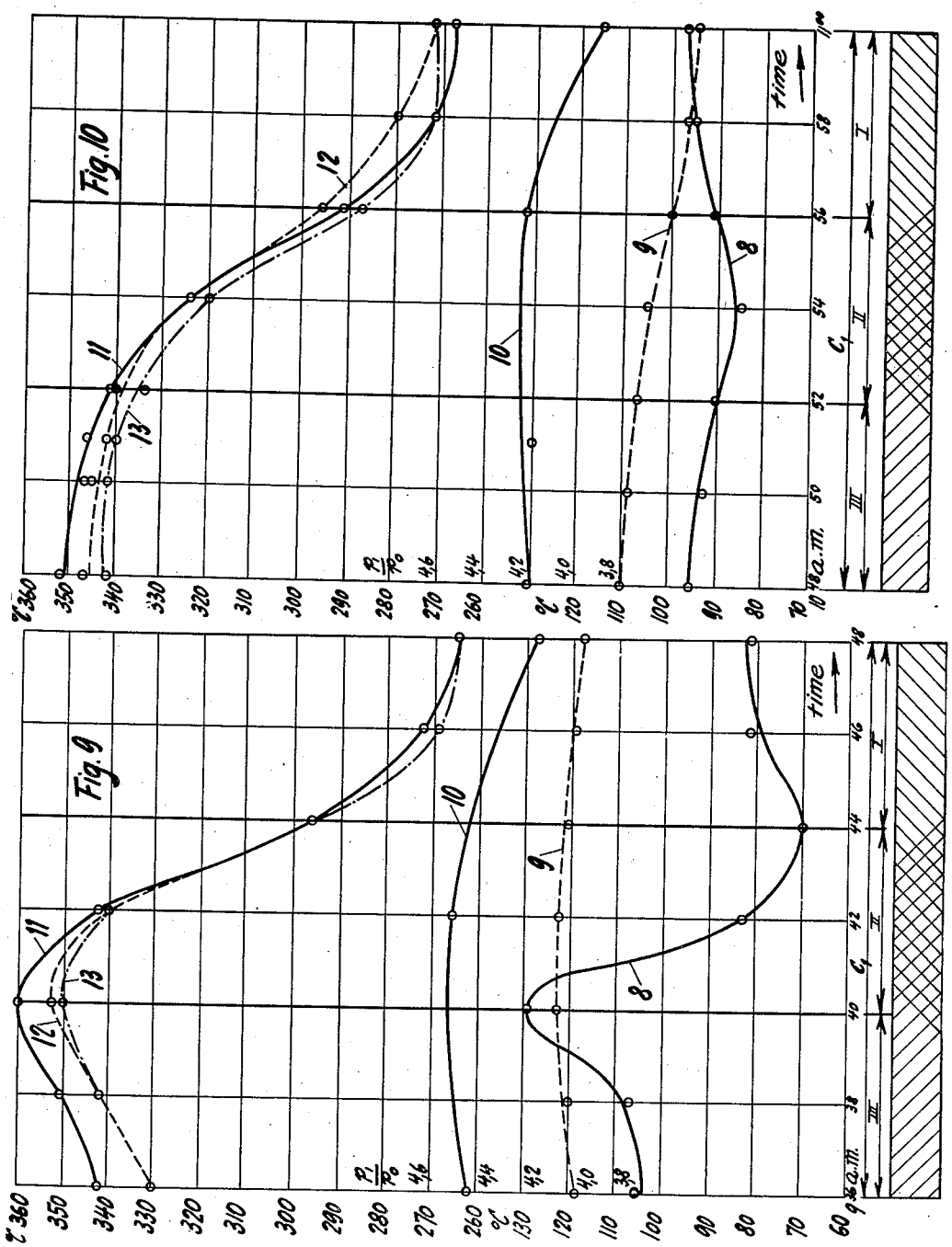
INVENTOR
HANS HOLZWARTH
BY
ATTORNEY

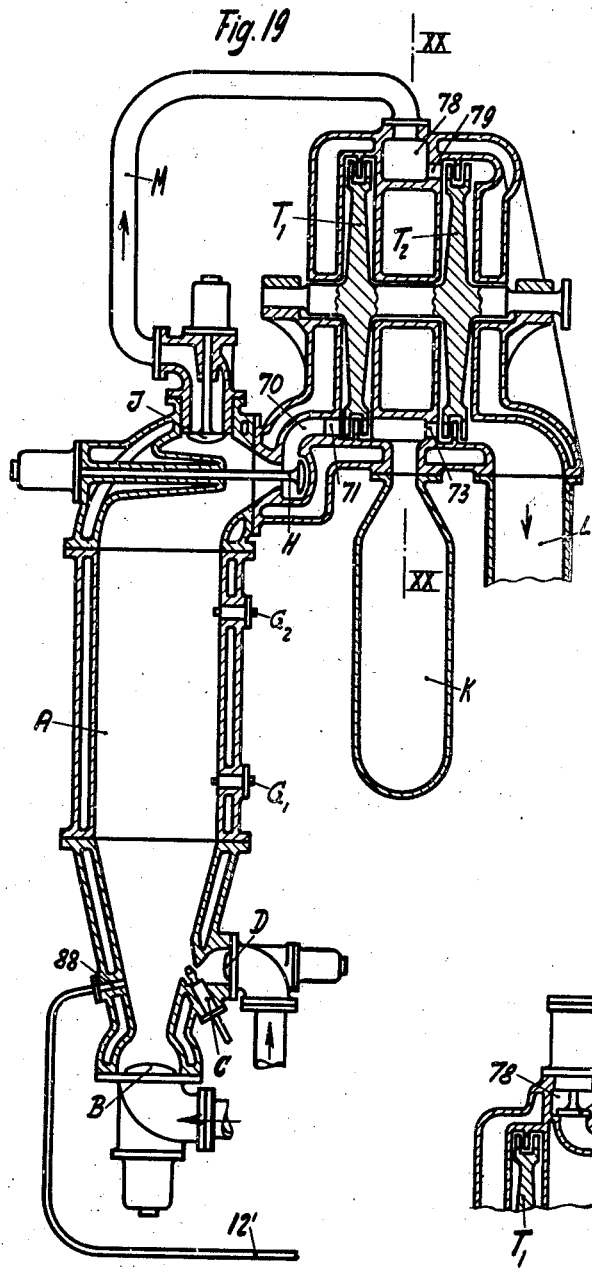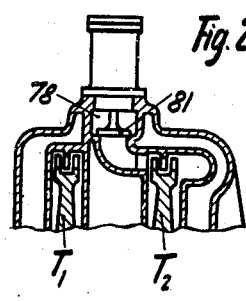

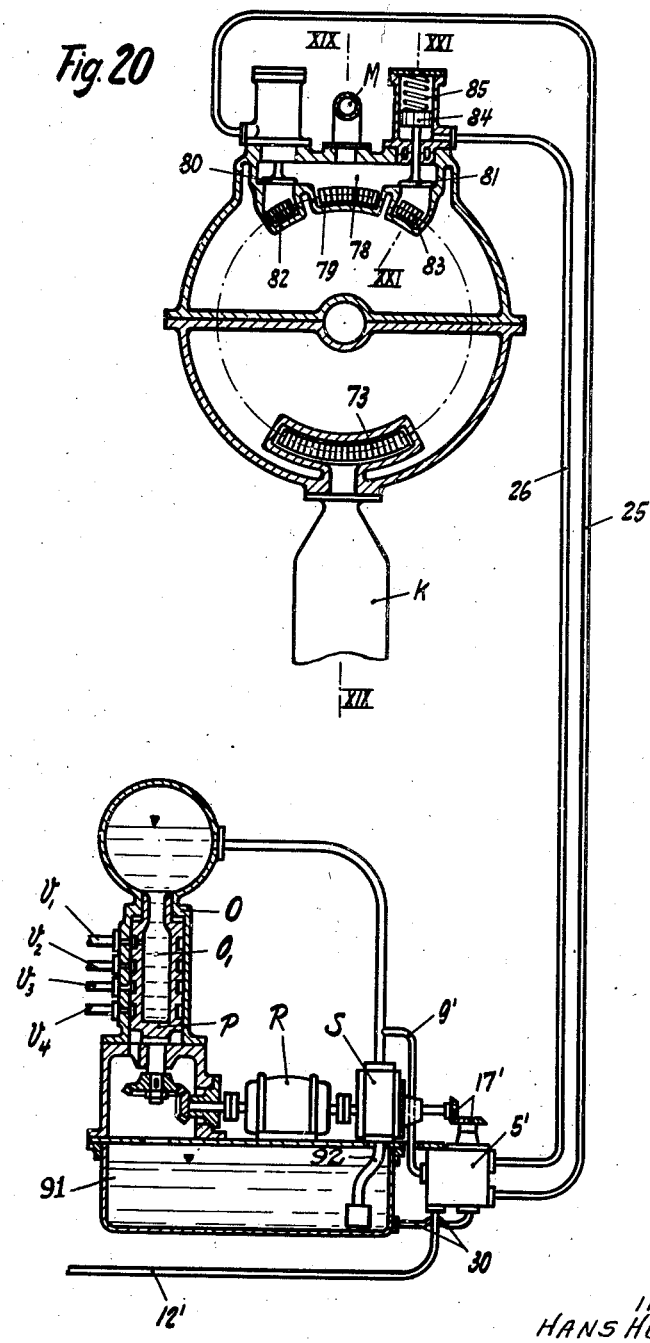

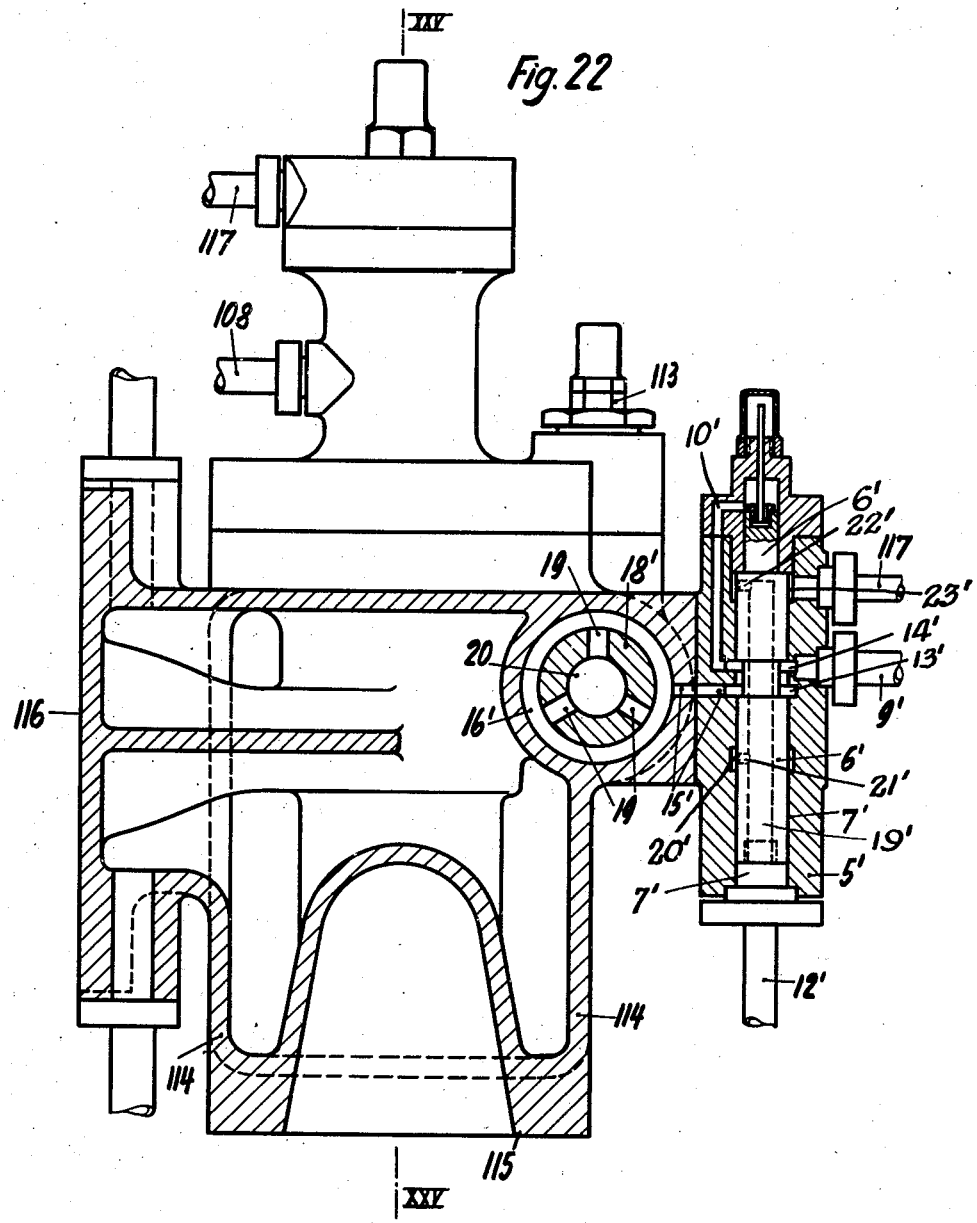

Sept. 27, 1938.  H. HOLZWARTH  2,131,047
METHOD AND APPARATUS FOR CONTROLLING THE IGNITION IN EXPLOSION CHAMBERS
Filed April 21, 1934  17 Sheets-Sheet 9

INVENTOR
HANS HOLZWARTH
BY
Joseph Hirschman
ATTORNEY

Sept. 27, 1938.  H. HOLZWARTH  2,131,047

METHOD AND APPARATUS FOR CONTROLLING THE IGNITION IN EXPLOSION CHAMBERS

Filed April 21, 1934   17 Sheets-Sheet 10

INVENTOR
HANS HOLZWARTH
BY
ATTORNEY

Sept. 27, 1938.  H. HOLZWARTH  2,131,047
METHOD AND APPARATUS FOR CONTROLLING THE IGNITION IN EXPLOSION CHAMBERS
Filed April 21, 1934   17 Sheets-Sheet 12

INVENTOR
HANS HOLZWARTH
BY
ATTORNEY

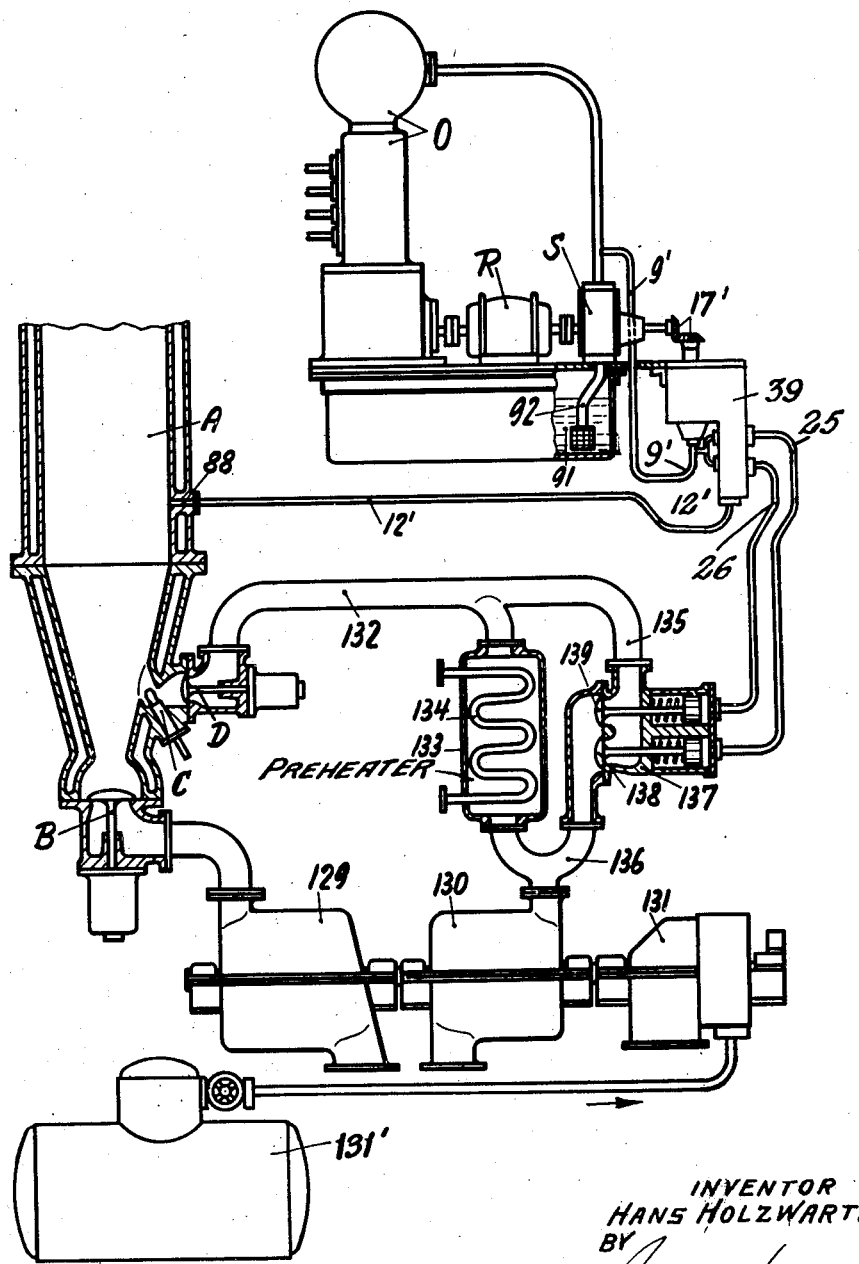

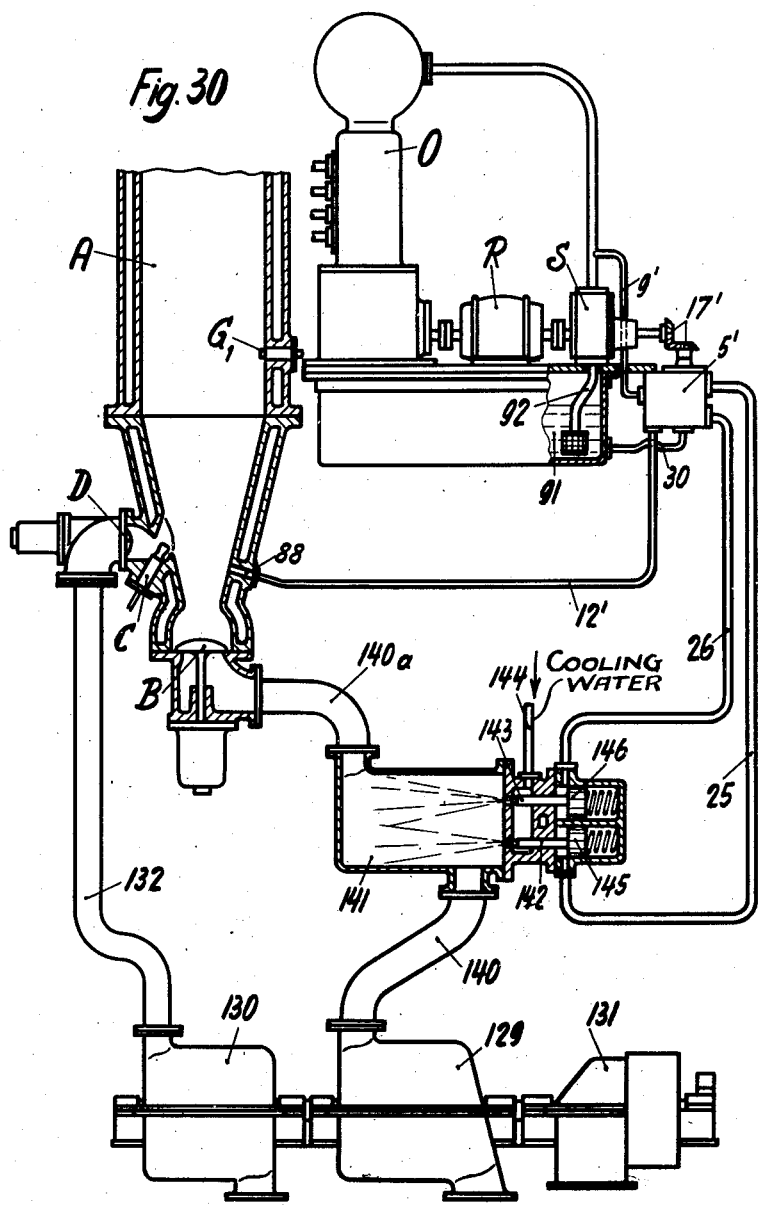

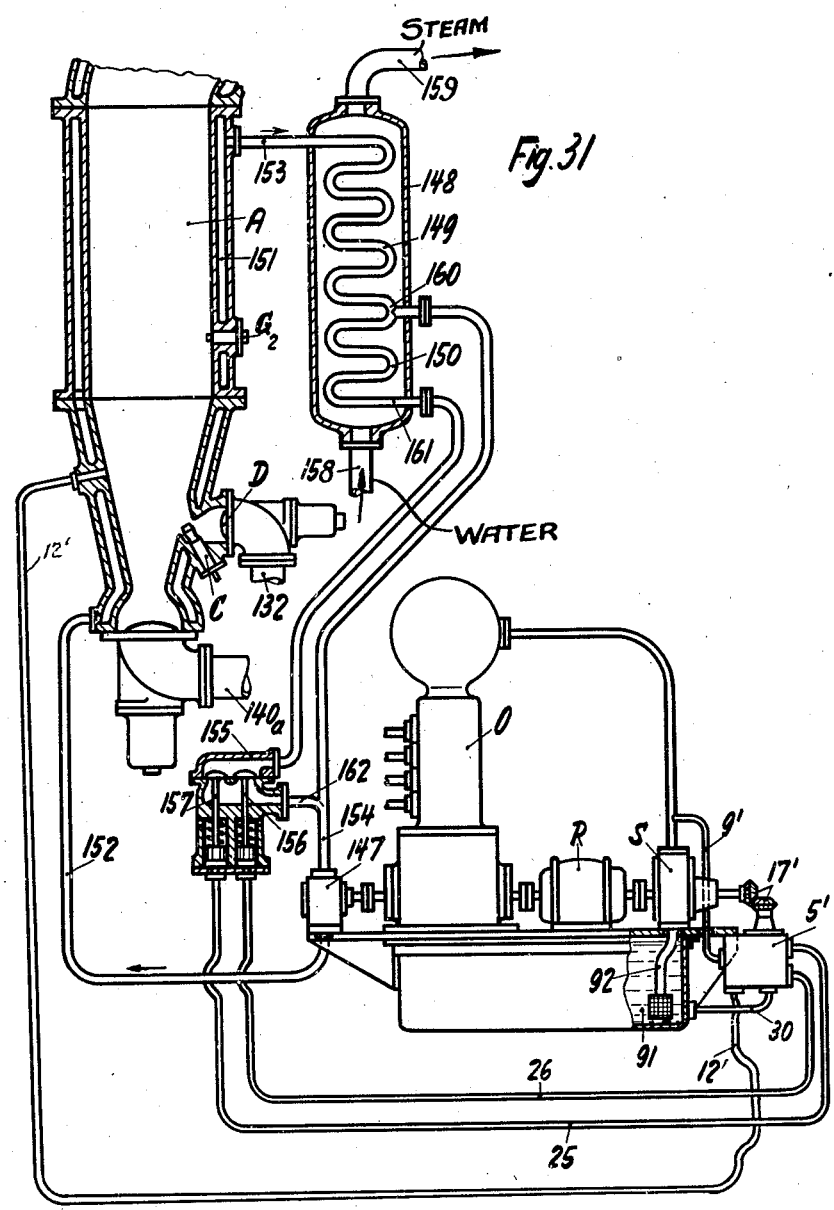

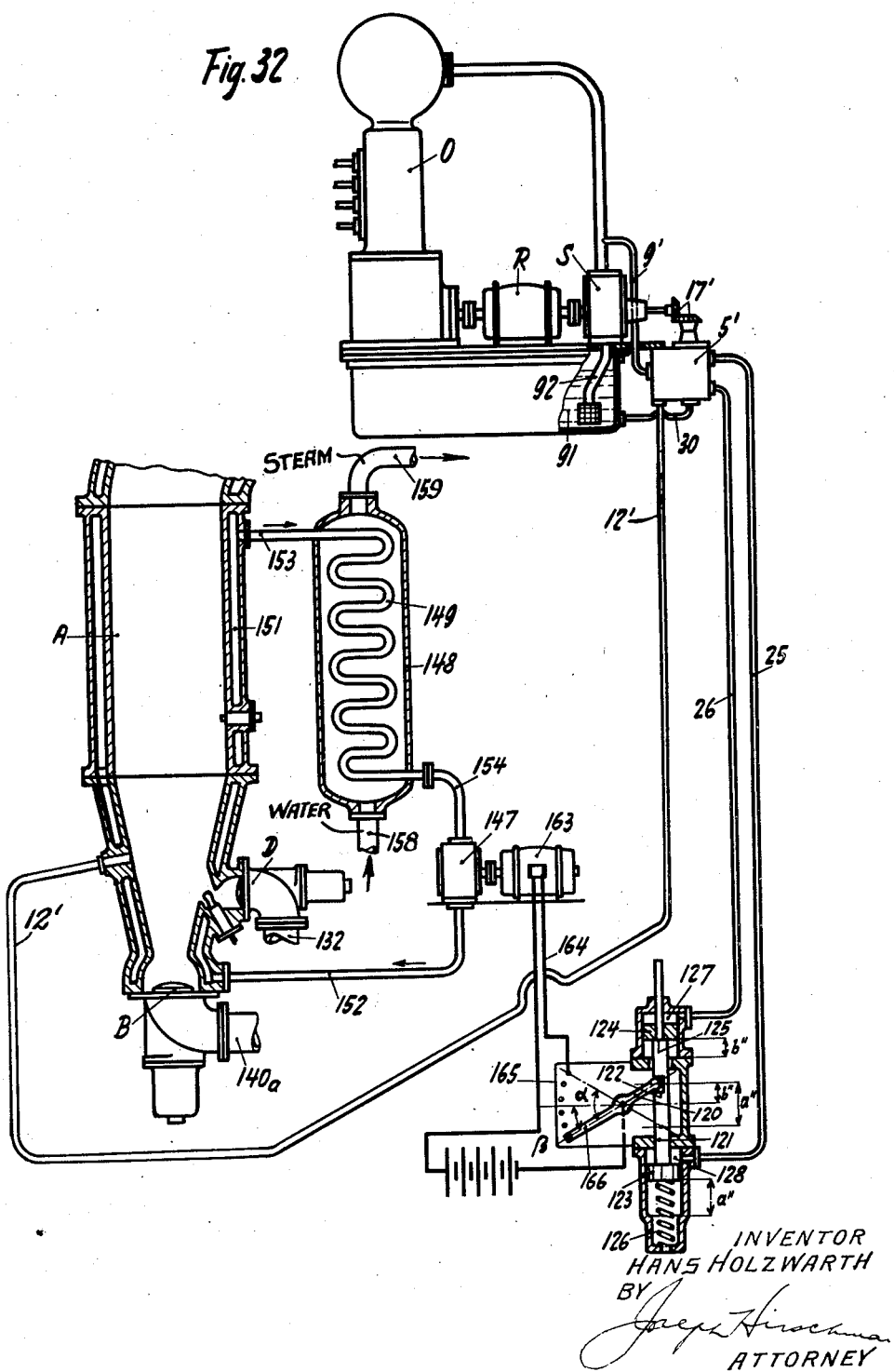

Sept. 27, 1938.   H. HOLZWARTH   2,131,047
METHOD AND APPARATUS FOR CONTROLLING THE IGNITION IN EXPLOSION CHAMBERS
Filed April 21, 1934   17 Sheets-Sheet 17
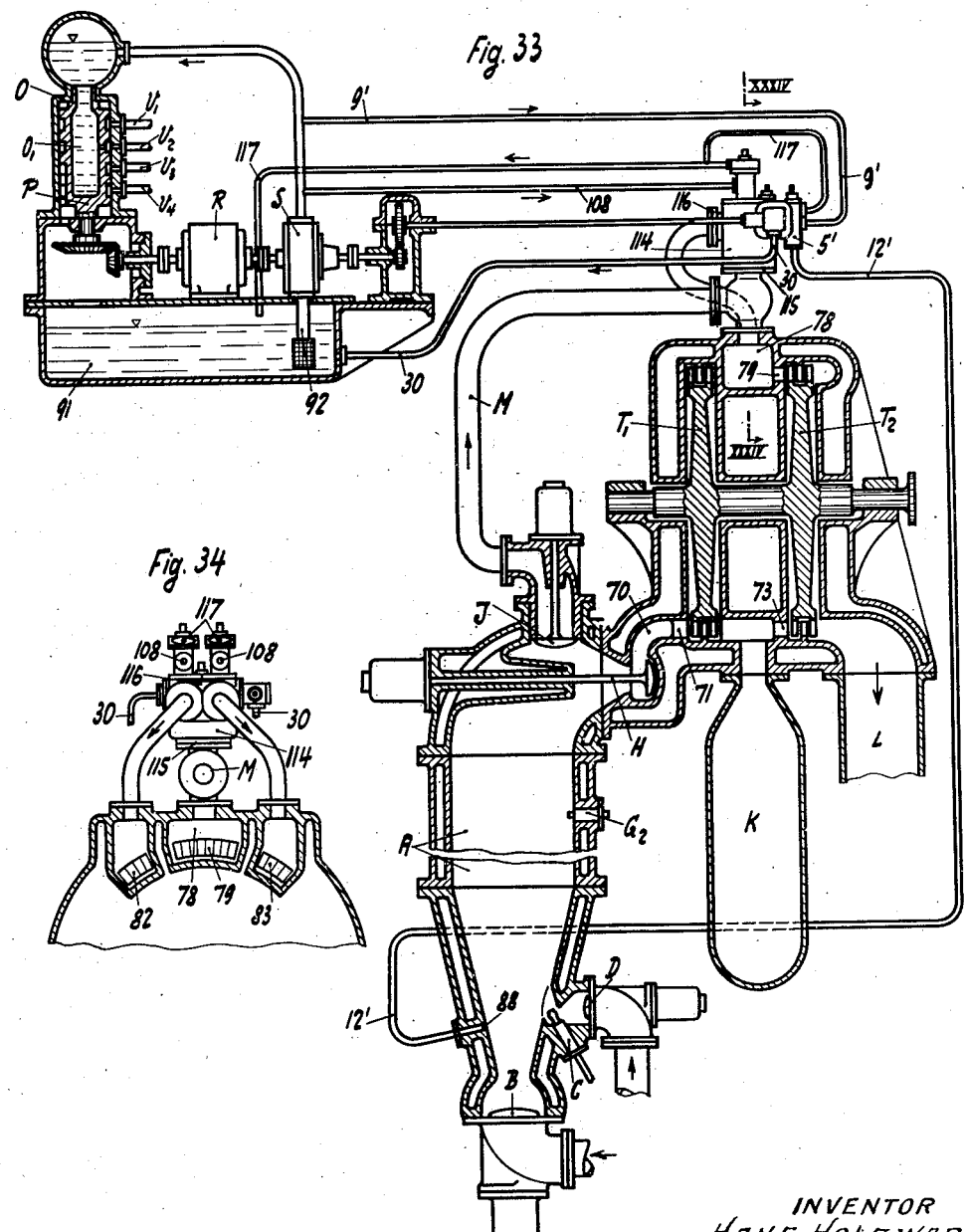
INVENTOR
HANS HOLZWARTH
BY
ATTORNEY Patented Sept. 27, 1938

2,131,047

UNITED STATES PATENT OFFICE 2,131,047

METHOD AND APPARATUS FOR CONTROLLING THE IGNITION IN EXPLOSION CHAMBERS

Hans Holzwarth, Dusseldorf, Germany, assignor to Holzwarth Gas Turbine Co., San Francisco, Calif., a corporation of Delaware Application April 21, 1934, Serial No. 721,705
In Germany April 24, 1933

28 Claims. (Cl. 60—41)

The present invention relates to a method and apparatus for igniting combustible mixtures in a pistonless constant volume intermittent explosion chamber, such as is employed particularly for the operation of explosion turbines.

It is the general object of the invention to provide an improved mode of ignition and likewise a control of the ignition whereby not only rapid but complete combustion of the fuel is obtained.

The ignition of the combustible mixtures introduced into and confined within constant volume explosion chambers was originally accomplished with the aid of externally controlled igniters, generally electric spark plugs, in the manner in common use in the piston engine art, such spark plugs being fired at pre-determined and easily controllable instants. Careful investigations on this type of ignition as applied to the constant volume explosion chambers have, however, revealed that while spark plugs effect satisfactory ignition in the case of piston explosion engines, nevertheless this type of ignition was accompanied by various disadvantages when employed in pistonless, constant volume explosion chambers which did not become evident in piston engines and hence were heretofore completely unrecognized. In the first place, undesired pre-ignitions were observed, that is, ignitions which occurred while the explosion chamber was still being charged, the normal course of operation of the plant being thereby seriously disturbed. These pre-ignitions were due primarily to insufficient scavenging of the chambers of the residual gases, there being no suitable mechanical means present (for example, a piston) for assisting in the scavenging, and particularly to incomplete expulsion of the slow burning, glowing or smoldering fuel particles of the preceding explosion.

A further disadvantage of the ignition process in explosion chambers provided only with externally controlled igniters arose from the fact that the explosions developed very slowly, due mainly to the comparatively small igniting surface presented at the moment of ignition. This disadvantage becomes especially severe in the preferred operation with spark plugs in which at the instant of ignition provided by the jumping of the spark across the electrodes only a point-like ignition surface is presented to the charge to be ignited, such ignition surface being extremely small in comparison to the volume of gas to be ignited. A comparatively long interval of time must therefore elapse before the whole charge filling the chamber is brought to ignition by the pointlike ignitor spark. Moreover, because of the slow ignition process the combustion of the mixture is not complete, tests having shown that unburned components are left, particularly when difficultly ignitable fuel is employed. As these unburned parts are not completely burned even during the subsequent expansion of the gases generated by the combustion of the charge, they leave the explosion chamber unused with the discharging gases.

In recognition of these disadvantageous phenomena and in the effort to eliminate the same effectively, I have more recently proposed a second mode of ignition in which the ignition of the combustible mixture confined within the chamber is initiated not by externally controlled ignition but by self-ignition of the charge with the aid of hot elements in the explosion chamber, such as heated chamber parts or a hot gaseous medium, such as residual combustion gases trapped in the chamber. This latter mode of ignition is not, strictly speaking, self-ignition and may be more accurately described as "thermo-ignition", so as to distinguish this mode of ignition from ignition by means of spark plugs and similarly externally controllable igniters, which will be referred to hereinbelow as "external igniter" or "externally controlled igniter", and from true self-ignition, accomplished by compression of a combustible mixture and without the aid of heat introduced as such from external sources. For carrying out this mode of ignition by means of hot elements within the chamber, I have proposed to enclose or trap between the outlet member of the explosion chamber and the new charge introduced thereinto a hot gaseous medium, for example, the residual gases of the previous explosion. This gaseous residue at the discharge end of the chamber is brought to such a temperature that at the surface of contact between this body of gas and the new charge the thermo-ignition temperature is reached which then directly initiates the combustion.

Investigations with the above-mentioned self-ignition or rather thermo-ignition processes have confirmed its superiority over operation with externally controlled igniters. Ignition purely by thermo-ignition effects above all a very rapid explosion which is recognizable in an indicator diagram by a steep combustion line. Furthermore, the exhaust gases no longer show the presence of unburned fuel, thus presenting the important advantage over ignition with external igniters of complete utilization of the fuel.

Closer study of the explosion process as accomplished by thermo-ignition, has, however, brought to light the fact that even the thermo-ignition process, in spite of its various advantages over ignition by an external igniter, is not quite free of defects. Thus it has been established that not all of the fuel in the combustible mixture is burned during the rapidly developing portion of the explosion process, that is, during the steep rise of the combustion line in the indicator pressure-time diagram. It has been found to be necessary to keep the explosion chamber closed even after the termination of the above-mentioned steep portion of the explosion curve in order to insure the combustion of the residual portion of fuel before the outlet valve is opened and the expansion out of the chamber begins. Under certain circumstances care must be taken that combustion of the residual fuel portion occurs during the expansion itself. In operation with pure thermo-ignition the energy introduced in the form of the fuel is indeed converted into heat without loss; such energy is not, however, completely converted into a rise of pressure of the generated explosion gases, as would be desired, but the heat operates to heat to a considerable degree the walls of the explosion chamber and also the cooling medium in the cooling jacket of the chamber, such heat being carried off as waste heat and being utilizable only at considerably reduced efficiency.

It is the object of the present invention to provide a mode of ignition for explosion chambers which retains the advantages of the above-described ignition by thermo-ignition but avoids the disadvantages thereof. The solution of this problem according to the present invention is characterized by the action of controlled external igniters upon ignitable mixtures introduced into the explosion chamber which have reached the thermo-ignition point, that is, the temperature and pressure at which self-ignition will take place, or have just passed it. According to the invention, both the external and thermo-ignition are brought into action in a definite sequence upon the mixture confined in the explosion chamber. The preliminary ignition of the mixture is initiated either by thermo-ignition alone (in such case the operation of the external igniter occurs later, although still within the course of the explosion so initiated), or else the process is manipulated in such manner that the external ignition is made to act upon the mixture at the instant that the thermo-ignition point of the mixture is reached. In such case the original ignition is initiated primarily by the external igniter; but even during the so-initiated explosion thermo-ignitions automatically occur throughout the whole mixture in consequence of the immediate rise in pressure which raises the mixture above its thermo-ignition point. It is thus a feature of my improved ignition process that whether the initial ignition is effected by thermo or external ignition, the other of the two modes of ignition is brought into action during the course of the explosion following the initial ignition.

By means of the common action of the thermo and external ignitions upon the mixture in accordance with the invention, and by the mutual assistance of both modes of ignition so obtained, the result is first of all secured that the lag or slowness in the course of the explosion process which attends an ignition exclusively by externally controlled ignition is replaced by the extremely rapid pressure rise characteristic of thermo-ignition. A further advantage is obtained, and this was quite unexpected, that during the actual explosion, that is, during the steep rise of the combustion line in the indicator diagram, practically complete combustion of the whole quantity of fuel in the explosion chamber occurs. The unavoidable after-combustion of the fuel which heretofore followed the sudden pressure rise in pure thermo-ignitions is thus eliminated.

Figure 7:
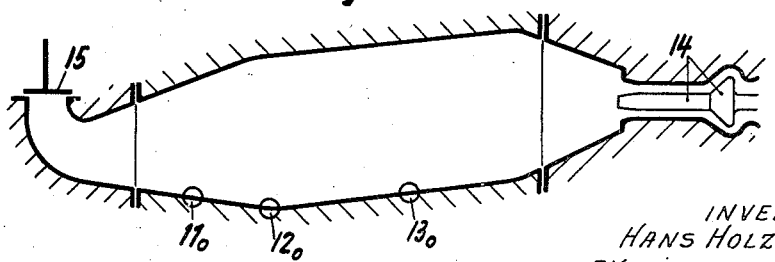
Figure 23:
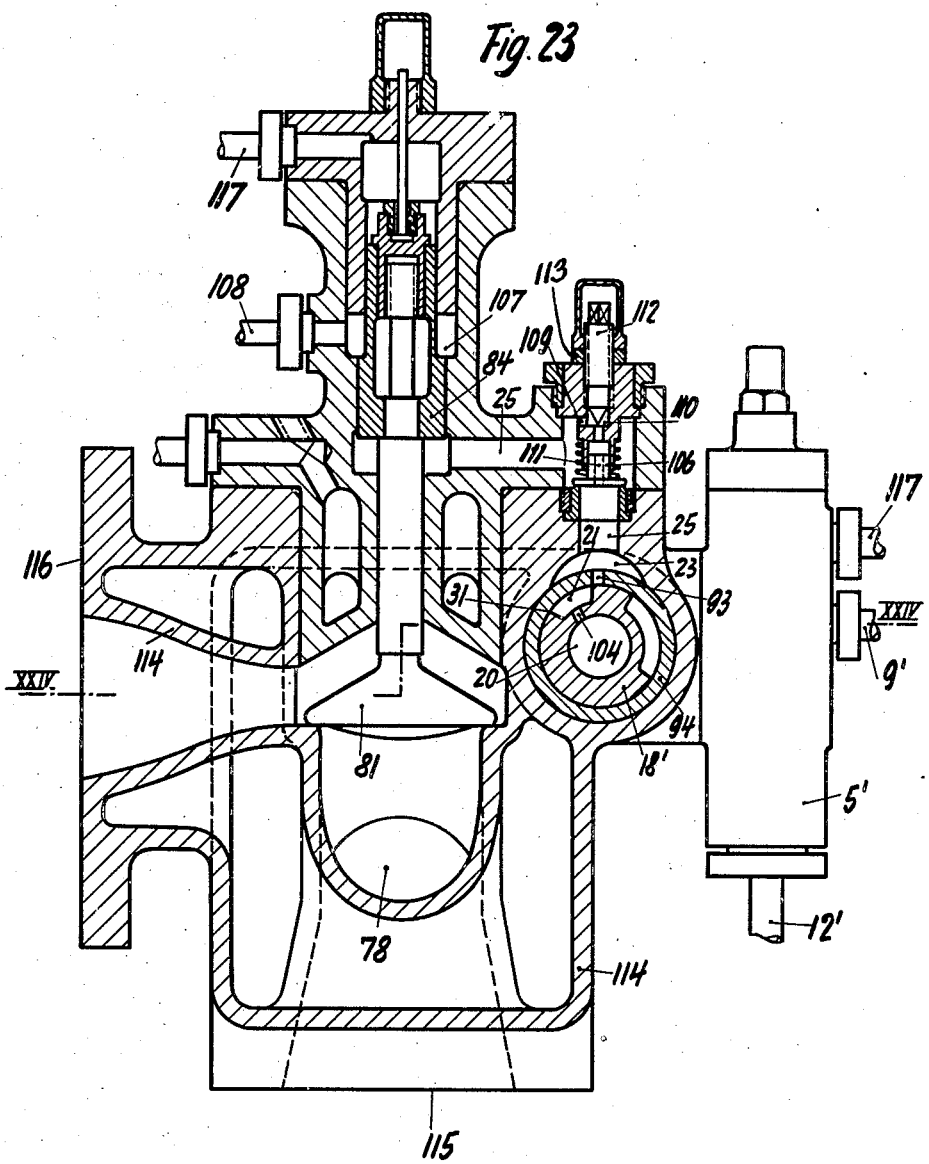
Figure 24:
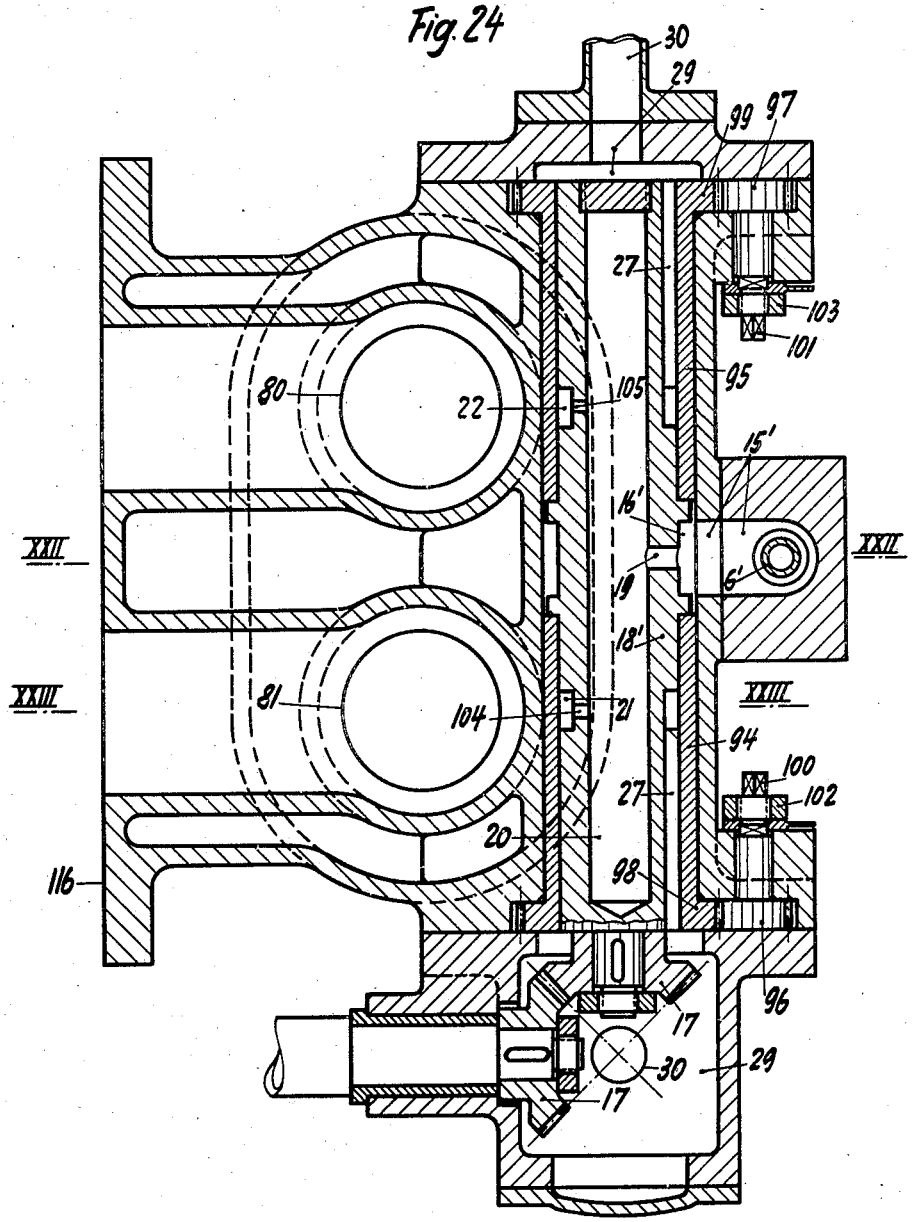
Figure 25:
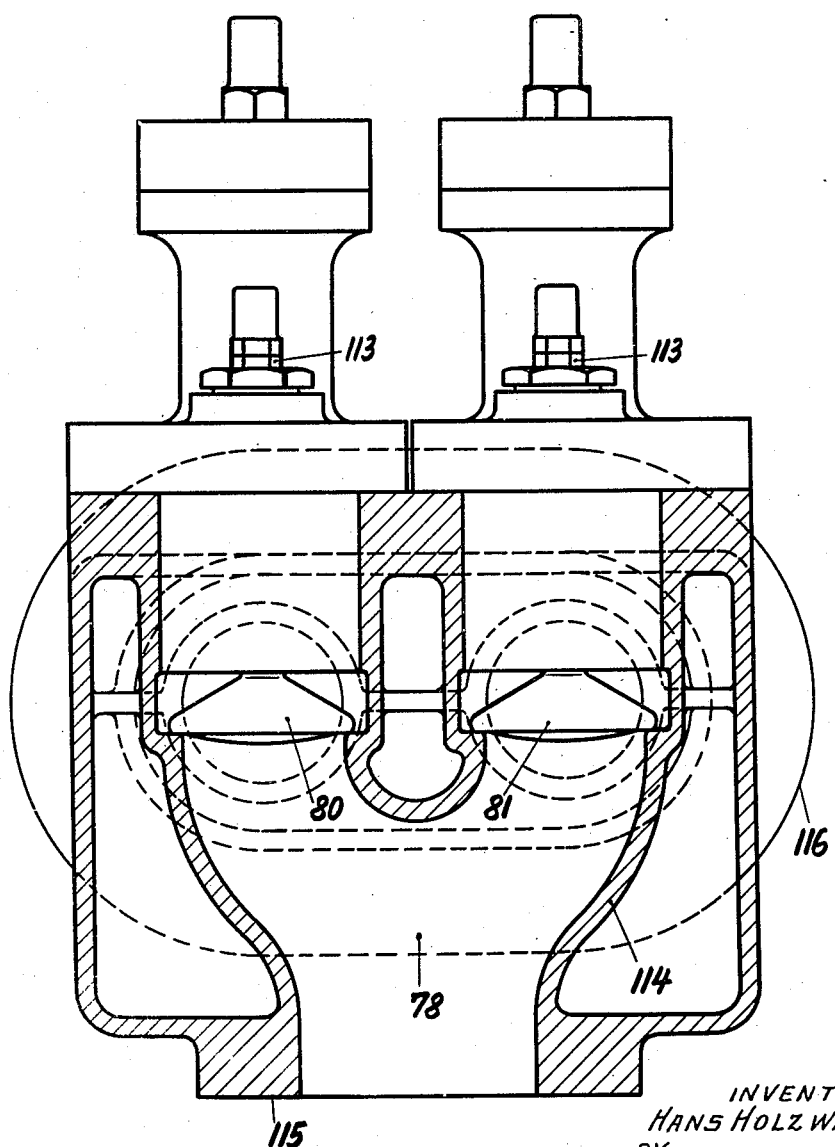
Figures 26, 27, 28:
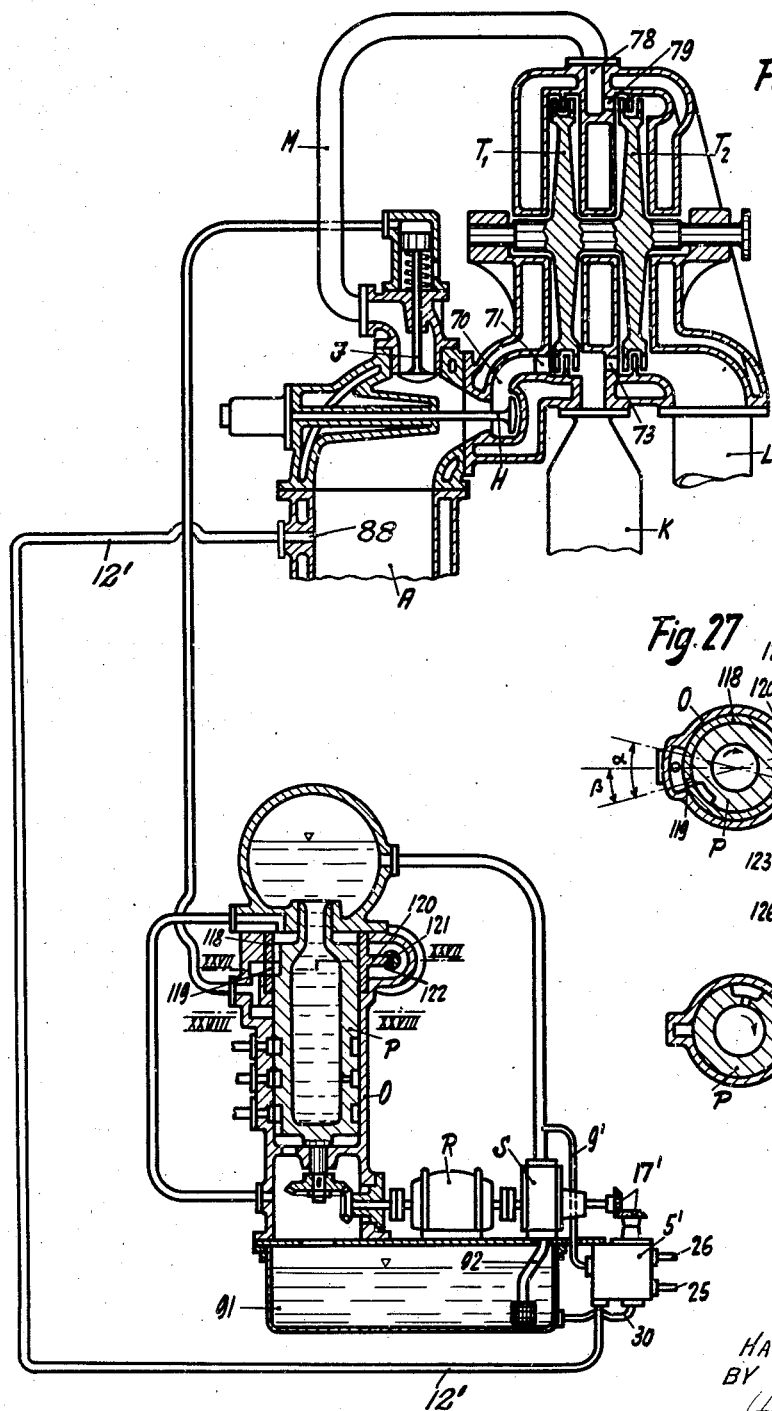

The invention will be further described and a number of methods and constructions for carrying out the same will be explained hereinbelow by way of example with the aid of the accompanying drawings forming a part of this specification. In said drawings, Fig. 1 shows schematically a longitudinal section through an explosion turbine plant embodying mechanism for carrying out the mode of ignition in accordance with the invention, the control being manual; Figs. 1a and 1b present sections along the lines Ia—Ia and Ib—Ib of Fig. 1 through the hydraulic valve controlling mechanism; Fig. 2 illustrates diagrammatically the time-pressure relationship according to my improved mixed ignition igniting process during the first part of the explosion phase, the abscissa scale being unusually large in relation to the ordinate scale to make the representation clearer; Fig. 3 shows the characteristic course of the time-pressure line upon initiation of the explosions by purely externally controlled ignition; Fig. 4 shows two time-pressure lines of which the one shown in light lines and beginning earlier corresponds to the operation with pure thermo-ignition, while the one shown in heavier lines and occurring later corresponds to operation with mixed ignition according to the invention; Fig. 5 shows diagrammatically the course of a regulation operation, selected by way of example, for the practical carrying out of my improved ignition process; Fig. 6 is a diagram showing the characteristics of the factors influencing the nature of the ignition upon change in the heating of the mixture to be ignited; Fig. 7 shows schematically a typical explosion chamber provided with inlet and outlet members and indicating three locations in the walls of the chamber at which temperature measurements were taken; Fig. 8 shows one of such measuring locations in section; Figs. 9 and 10 are diagrams illustrating special regulations suitable for carrying out and maintaining mixed ignition in accordance with the invention; Figs. 11 to 32 show a series of control devices of various kinds and constructions operating automatically for carrying out and stabilizing my improved mixed ignition operation in dependence upon the processes and phenomena occurring in the explosion chamber, in which figures Figs. 11 to 13 show mechanism for automatically controlling the character of the ignition, Fig. 11 being a vertical longitudinal section through the ignition controller along the line XI—XI of Figs. 12 and 13 and Figs. 12 and 13 being horizontal sections through the ignition controller along the lines XII and XII and XIII—XIII respectively, of Fig. 11; Fig. 14 shows a different form of ignition controller and represents a vertical longitudinal section through the controller along the line XIV—XIV of Figs. 17 and 18; Fig. 15 is a fragment of a similar section showing the middle piston valve position; Fig. 16 shows a section similar to Fig. 15 but illustrates the upper piston valve position; Figs. 17 and 18 are horizontal cross sections along the lines XVII—XVII and XVIII—XVIII, respectively, of Fig. 14; Fig. 19 is a vertical section along the line XIX—XIX of Fig. 20 showing a plant wherein the regulation of the ignition is effected by varying the size of the minimum discharge flow cross-section or area available to the displaced residual gases; Fig. 20 represents a vertical section along the line XX—XX of Fig. 19; Fig. 21 is a partial section along the line XXI—XXI of Fig. 20; Fig. 22 is a vertical section through an arrangement in which the ignition controller and the devices upon which it operates are built as a unit, the section being taken along the line XXII—XXII of Fig. 24; Fig. 23 is a similar view along the line XXIII—XXIII of Fig. 24; Fig. 24 is a horizontal longitudinal section along line XXIV—XXIV of Fig. 23; Fig. 25 is a vertical section along the line XXV—XXV of Fig. 22; Fig. 26 shows an explosion turbine plant in vertical longitudinal section and illustrates a different mode of regulation; Figs. 27 and 28 are horizontal sections along the line XXVII—XXVII and XXVIII and XXVIII, respectively, of Fig. 26; Fig. 29 shows diagrammatically an explosion turbine plant in which the control of the ignition is effected by regulating the temperature of the supercharging air; Fig. 30 is a similar view of a plant constructed in accordance with the invention wherein the ignition is controlled by regulating the moisture content of the scavenging air; Figs. 31 and 32 show arrangements wherein the ignition is controlled by regulating the temperature and the quantity, respectively, of the cooling agent for the explosion chamber; Figs. 33 and 34 illustrate a plant embodying the mechanism shown in Figs. 22 to 25, Fig. 34 being a section taken along the line XXXIV—XXXIV of Fig. 33.

Referring to the drawings, A indicates an elongated explosion chamber of known construction provided with conical inlet and outlet sections. The scavenging air valve is shown at B and is arranged with its axis coincident with that of the explosion chamber, the fuel injection valve being shown at C and the super-charging air valve at D. The compressor E delivers the scavenging air through the conduit $E_1$; the charging air is delivered by the charging compressor $E_2$ coupled with the compressor E, both compressors being driven by the engine F which may be in the form of a steam turbine. The supercharging air is pre-compressed in the compressor E to an intermediate pressure corresponding to the scavenging pressure and is further compressed in the second compressor stage $E_2$ to the required charging pressure. The fuel nozzle C is connected by conduit $C_1$ with the fuel feeding mechanism $C_2$. $G_1$ and $G_2$ are externally controlled igniting devices, such as spark plugs, which are built into the wall of the cylindrical middle section of the explosion chamber. The latter is surrounded in the usual manner by a cooling jacket. At the outlet end of the explosion chamber are arranged two controlled outlet members, one of them being the outlet or nozzle valve H through which the hot combustion gases generated in the explosion chamber are discharged, and the other the auxiliary exhaust valve J through which at least a part of the residual gases escape during the scavenging of the chamber. The high pressure gases passing through the nozzle valve H strike the explosion turbine $T_1$, the gases discharging from the latter passing by way of a pressure equalizer K to the continuous current turbine $T_2$ from which the gases are discharged through the exhaust pipe L. The continuous current turbine $T_2$ is impinged also by the residual gases flowing through pipe M and discharging from the explosion chamber through the valve J during the scavenging period. The rotors of the turbine $T_1$ and $T_2$ are coupled in common with an electric generator N which receives the available output of such turbines.

All of the inlet and outlet members of the explosion chamber A are connected in known manner with the hydraulic pressure control mechanism O which is provided with a separate control section for each controlled element. The control mechanism illustrated consists as usual of a rotating member P which is provided upon its circumference with control blocks $P_1$ and $P_2$ for each individual control section (see Figs. 1a and 1b) and is driven at uniform speed by the electric motor R. The latter drives also the fuel feeding mechanism $C_2$ and the pump S which continually feeds a liquid under pressure (for example, oil) into the receiver space $O_1$ of the control mechanism O through conduit $S_1$. The space $O_1$ of the control mechanism is brought into communication at definite instants, depending upon the speed of the member P, with the individual cylinders U of the controlled members through the respective conduits $V_1$ to $V_4$ which are controlled by the control blocks $P_1$ and $P_2$ of the associated control sections of the control mechanism. To enable the opening and closing instants of a valve of the explosion chamber to be altered or shifted with respect to each other within one and the same control section of the control mechanism, the control section in question (in the embodiment illustrated, the uppermost section) is provided with two vertically spaced circumferential grooves, one communicating with the space $O_1$ and the other with an exhaust space, such grooves being brought alternately into communication with the pipe $V_1$, there being associated with the upper groove an adjustable intermediate bushing W. By rotation of this bushing the control points of the opening and closing instants of the controlled valve can be displaced relatively to each other.

The charging of the explosion chamber A occurs in known manner. After the scavenging of the chamber, the latter is first charged with charging air from the compressor $E_2$ through the valve D, while fuel is introduced through the injection valve C. At the end of the charging period the chamber is occupied with an ignitable mixture of fuel and air. According to the invention, this mixture is ignited by the spark plugs $G_1$ and $G_2$ and by thermo-ignition, the two modes of ignition being brought into action simultaneously, or else the external, i. e., the spark plug ignition can be made to act a very short time after the self-ignition is designed to occur. The thermo-ignition temperature of the mixture is created by the action of heat upon its component parts. To this end a certain amount of residual gases is first of all retained or trapped at the outlet end of the chamber by a premature closing of the outlet of the chamber, the sensible heat of such gases being then transmitted to the mixture of fuel and air for accomplishing the thermo-ignition thereof. This result is secured by virtue of the fact that the scavenging air entering through the valve B spreads out uniformly over the whole explosion shamber cross-section because of the Venturi-like formation of the inlet end section of the chamber and pushes before it the residual combustion gases in the manner of a piston. With the aid of the adjustability of the bushing W above-described, the actuation of the operating piston U of the outlet valve J can be so displaced in time that the outlet valve closes at a moment when the scavenging air has not yet penetrated to the outlet valve. A certain amount of residual combustion gases thus remains behind at the outlet end of the explosion chamber and by radiation and conduction transfers its heat to the new charge during the remainder of the charging process.

In Fig. 2 are shown two pressure-time diagrams obtained during experiments on a practical scale on an explosion chamber operated in accordance with the mixed ignition process of the present invention and having a volume of 0.075 cubic meter, the chamber being operated at 90 complete working cycles per minute. In these diagrams the ordinates represent pressures and the abscissae time. These diagrams show only a portion of the working cycle of the explosion chamber, the complete cycle developing during a complete rotation of an indicator drum driven from the control shaft, so that the control time point of the external ignition, which is designated with the letters St, appears always upon the same place of the indicator strip. The diameter of the drum was made unusually large so as to obtain a correspondingly elongated curve; in the illustrated diagrams an abscissa distance of 11.8 mm. corresponded to only one hundredth of a second.

As already stated, St indicates the control time point of the external igniter, which coincides with the 0 point on the abscissa. The heavy line curve represents a mixed ignition operation in accordance with the process of the present invention, in which the ignition is initiated by thermo-ignition. In this mode of ignition the pressure rise in the explosion chamber has its perceptible beginning at the point a, which lies 0.025 second in advance of the moment of external ignition; the original ignition has in fact been initiated somewhat earlier. Still within the pressure rise of the explosion line, which is represented by the steep line b, the operation of the external igniter occurs at the point St on the abscissa. The externally controlled ignition effected in this manner occurs at the instant C of the heavy line curve. There is thus subjected to the action of the externally controlled igniter a mixture which at the externally controlled ignition instant C or St has just exceeded the thermo-ignition temperature and pressure. The character of the heavy line curve shows clearly the improvement presented by the new mode of ignition. The steep and almost straight line course of the pressure rise indicated by the line b, and the following almost horizontal saddle line d of the heavy line diagram lead to the conclusion that even during the course of the pressure rise almost the whole fuel content of the mixture has been burned.

A similar favorable result is shown also by the light line curve of Fig. 2 which represents the explosion conditions when the thermo-ignition and external ignition occur simultaneously. In this diagram the mixture to be ignited has reached the thermo-ignition point at the instant e which lies upon the same abscissa as the externally controlled ignition instant St of the externally controlled igniter. The pressure rise of the explosion curve begins perceptibly only at the later instant f. This instant, according to the time pressure diagram, is about 0.025 second after the externally controlled ignition instant St and the thermo-ignition instant e which is coincident with the instant St. It will be recognized from the course of the curve, in particular from the very steep and straight line showing the pressure increase on explosion indicated at g, and likewise from the practically horizontal saddle line h leading from the line g, that not only the external ignition but above all the thermo-ignition has taken part in the explosion of the mixture confined in the chamber.

The conditions during explosion illustrated diagrammatically in Fig. 2 upon the basis of practical tests make it further clear that all those diagrams whose pressure rise is between the sections b and g of the illustrated limiting diagrams embodying the mixed ignition process of the invention, correspond at times to such explosions as are initiated by external and thermo-ignition or by thermo- and external ignition in the sense of the above described ignition process according to the invention. All explosion arising from such mixed ignition show the feature of the present invention of practically complete combustion of all the fuel even during the pressure rise. Thoroughgoing investigations with explosion chambers operated with heavy oil have established that by the use of the mixed ignition process according to the invention an explosion efficiency of over 90% can be attained. The introduced quantity of fuel is thus burned to the extent of over 90% during the explosion and the whole quantity of liberated heat is utilized for increasing the pressure. Any residues of fuel become burned during the interval between the instant of maximum pressure and the instant of opening of the outlet member of the chamber, that is, during the saddle or horizontal portion of the curve following the explosion line shown in the diagram. The fuel heat which is not liberated during the pressure rise accompanying the explosion is transmitted during the explosion period and during the time occupied by the saddle to the walls of the chamber and thus to the cooling medium. Investigations conducted on the new ignition process and directed toward ascertaining the combustion efficiency showed that the unburned components varied from zero to 2%. This result justified the conclusion that 98 to 100% of the energy contained in the fuel forming part of the mixture being burned was liberated by combustion during the explosion process and is brought into use during the explosion process for raising the pressure of the gases.

By the use of my improved ignition process there is obtained also the advantage that the excess of scavenging air, that is, that quantity of air which does not serve for charging the explosion chamber, but leaves the explosion chamber with the residual gases of the preceding explosion, falls to a hitherto unattainable minimum value. Aside from this fact, there can be obtained by the use of the mixed ignition process according to the invention a heretofore unobtainable working capacity, that is, the practically maximum attainable machine output by properly dimensioning and mutually relating the interdependent factors influencing the character of the explosions, such as the number of cycles per unit of time, the pressure and temperature of the charging air, and the temperature of the cooling medium of the explosion chamber.

The thermo-ignition temperature of the charge required for carrying out the present invention can be obtained in various ways. Satisfactory methods are explained in detail below. One procedure consists in the transmission of heat to the mixture or to its components. The most available source of heat is the residual heat of the preceding explosion. In order to insure that at the moment of the externally controlled ignition the thermo-ignition point has also actually been reached in the sense of the invention, or has just been exceeded, it is necessary to control the quantity of heat transferred to the mixture or to its components. If unregulated amounts of heat were permitted to act upon the mixture to be ignited or its components, it might happen that the conditions which prepare the mixture for ignition in accordance with the invention would not at all be obtained; in such case a mode of ignition would set in in which pure externally controlled ignitions with their above indicated disadvantages would appear. With unregulated transfer of heat to the mixture the situation might also arise that the required preparation of the mixture would be so considerably exceeded that purely thermo-ignition would set in and, in fact, perhaps even pre-ignition.

The requirement for regulated heat transmission to the mixture or its constituents becomes necessary particularly when the residual heat of the preceding explosions is to be utilized and is to be transferred to the mixture or to the components of the mixture of the next succeeding explosion. For this residual heat is subjected to considerable fluctuations which must be equalized, such fluctuations arising particularly as a result of changes in the heat content of the mixture introduced into the explosion chamber, and being unavoidable in carrying out the regulation of the output of the plant. There must also be considered the fact that under the influence of the successive explosions the explosion chamber becomes heated to a greater and greater extent and the temperature of the chamber walls and of the cooling medium likewise rises. By heat radiation the temperature of the mixture introduced into the explosion chamber thus increases so that the condition of the mixture varies at times.

A further and especially important discovery underlying the present invention is that these fluctuations in the residual heat can be completely equalized for stabilizing the ignition process by altering the displacement or scavenging process of the residual combustion gases of the preceding explosion; in particular it is proposed to change or regulate the scavenging process during the operation of the explosion chamber. The possible changes in the scavenging process can be effected in a great variety of ways. The control of the quantity of residual heat transferred has proved to be especially simple when carried out by varying the narrowest flow cross-section, generally the nozzle throat area, which is one of the factors determining the degree of displacement of the residual gases out of the explosion chamber during the operation. However, the duration of the displacement or scavenging can be changed simultaneously with the change in the minimum flow area, or the change in duration can be utilized alone. By changing both of these factors the quantity of gases which is trapped at the outlet end of the explosion chamber can be varied, at the bounding surface of which mass of gases directed toward the newly introduced combustible mixture the thermo-ignition of the mixture occurs upon attaining the requisite temperature. The larger the quantity of gases trapped in the chamber, the stronger will be the influence exerted per unit of time upon the condition of the mixture, so that, for example, a decrease in the quantity of residual heat available for transference arising in consequence of a comparatively smaller fuel feed, can be counterbalanced by trapping a larger quantity of residual gases in the next working cycle. This result may be attained by reducing either the minimum outlet cross-section available to the discharging residual gases, or the displacement time, or by both measures. If, conversely, the residual heat of the preceding explosion is too great, the undesirable excessive heat influence upon the mixture to be ignited can be counterbalanced by reducing the amount of gases retained in the explosion chamber by opening a larger outlet area or by increasing the displacement time or by both measures.

The above described conditions will be further explained with aid of the diagrams of Figs. 3 to 5.

Fig. 3 shows a time-pressure indicator diagram which represents the pressure course in the explosion chamber with purely external ignition with which thermo-ignition has not cooperated, as is quite clearly indicated by the slow rise of the time-pressure line $i$. The absence of thermo-ignition is due to too small a heat content in the residual gases of the preceding explosion trapped at the outlet end of the explosion chamber to produce the thermo-ignition temperature. An insufficient degree of residual heat will be encountered when, under certain load conditions of the explosion chamber or of the explosion turbine, comparatively small quantities of fuel are introduced into the chamber, so that lower degrees of heat are worked with. In such case the output falls not merely in correspondence with the reduced quantity of fuel, but to a considerably greater degree. This phenomenon can be explained by the fact that the residual heat resulting with a smaller heat content in the mixture in no way suffices to prepare the mixture or its components up to the externally controlled ignition instant to such an extent that a more or less complete explosion occurs. During the pressure rise only a comparatively small part of the fuel burns, while the remaining, far larger part either burns later or at least in part leaves the chamber unburned with the discharging gases.

On the other hand, the time-pressure line $k$ in Fig. 4 represents the explosion characteristic on operation with pure thermo-ignition, in which case the heat content of the preceding explosion or explosions, in contrast with the just-described case, is assumed to be greater than is necessary for obtaining a satisfactory preparation of the mixture. In this case, as the steep portion of the time-pressure curve $k$ of Fig. 4 indicates, there are obtained rapid explosions with a fairly steep pressure rise. Because of the vigorous and long-lasting after-combustion, during the saddle period following the pressure rise, of the fuel portion unburned in the explosion there appear the disadvantages described in connection with the pure thermo-ignition process. These disadvantages indicate that this active and long-lasting after-combustion which is unavoidable in pure thermo-combustion, can manifest itself during the saddle period only in a heating up of the walls of the explosion chamber, but not in an increase in the pressure of the generated explosion gases.

To make clearer the superiority of the mixed ignition process according to the invention over the pure thermo-ignition process according to curve $k$ comparison is made with diagram $b$—$d$ from Fig. 2 which has been drawn in Fig. 4 in heavy full lines, such latter curve representing the explosion conditions according to the invention upon ignition which is initiated by thermo-ignition and is immediately followed by an externally controlled ignition. Comparison of the two curves in Fig. 4 shows clearly that the process according to the invention yields a higher combustion gas pressure. The larger diagram surface indicates further an increase of the work which can be utilized with higher efficiency.

It has already been mentioned that with the measures proposed by the present invention it has become possible to bring the efficiency of the explosion process to the optimum height even upon change of the heat content of the mixture in the explosion chamber, and to maintain such efficiency constant at such optimum value. This result may be obtained, as already mentioned, by altering the scavenging process for the residual combustion gases, advantageously during the operation, such change being effected in the simplest manner either by changing the narrowest cross-section of the discharge path for the residual gases, or by changing the scavenging period or by making both changes. If, speaking pictorially, (see Fig. 2) the diagrams lie too much toward the thermo-ignition side, that is, if the perceptible beginning of the thermo-ignition (point $a$) lies more than 0.025 second in advance of the externally controlled ignition instant $St$, so that the thermo-ignition is no longer supported by the external ignition during the pressure rise (within the diagram section $b$) that is, no so-called mixed ignitions take place, then in such case the narrowest discharge path for the expelled residual gases is increased or the displacement or scavenging period of the explosion chamber is prolonged or both these expedients are resorted to. These changes may be carried out in the usual manner by displacement of the control instants of the appropriate valves at the control mechanism O, such regulation being accomplished in the illustrated example of the invention by rotation of the intermediate bushing W. By these measures the diagrams are set back or retarded (again speaking pictorially) into the optimum range for the initiation of the ignition illustrated in Fig. 2, about 0.025 second before and after the control instant $St$ of the external igniter, such effect being due primarily to the fact that as a result of the vigorous scavenging the amount of hot gas residue which remains in the explosion chamber and which acts to prepare the combustible mixture for ignition and in greatest measure contributes to the thermo-ignition is reduced.

If, on the other hand, the explosions are slow, that is, they are not completed within $0.025 + 0.05$ (approximate duration of the explosion) $= 0.075$ second after the instant $St$ at which the external igniter is fired, then the narrowest discharge path for the expelled residual gases is reduced or the scavenging period is reduced or both measures are resorted to simultaneously in order to reduce the scavenging effect. With reduced scavenging a correspondingly larger body of hot residual gases remains at the outlet end of the explosion chamber, which favors the splitting up and preparation for ignition of the components of the mixture and thus paves the way for the realization of the ignition process according to the invention in the next charge.

Fig. 5 shows diagrammatically the course of a regulating process in the above mentioned sense, such process having been carried out on a practical scale with an explosion chamber with the characteristics above described. The step-shaped curve 4 in Fig. 5 corresponds to the narrowest discharge path cross-section of the outlet valve arranged at the outlet end of the explosion chamber, the abscissa indicating time (measured from 15:00 o'clock or 3 p. m.) and the ordinates the narrowest cross-section in square centimeters. Curve 5 represents the temperatures of the charging air before entry into the explosion chamber; while curve 6 shows the average temperature of the cooling oil for the walls of the explosion chamber, that is, the arithmetical mean between the inlet and outlet temperatures, and curve 7 indicates the pressure increases $$\frac{p_1}{p_0}$$

that is, the ratio between the maximum combustion gas pressure $p_1$ after the explosion to the pressure $p_0$ of the combustible mixture prior to the explosion. The abscissa is divided into three ranges, namely, the range $m$ with a given feed of the fuel pump; the range $n$ in which the quantity of fuel delivered has been increased in comparison with the amount delivered in the range $m$; and the range $p$ in which a still greater fuel feed than in ranges $m$ and $n$ has occurred. The diagram fields $m$, $n$ and $p$ thus correspond to three regulating conditions with increasing heat content in the mixture which is burned in the explosion chamber. Finally, there has been indicated below the curves the nature of the ignition employed during the different regulating conditions. To distinguish the different kinds of ignition it may be mentioned that the first type is one in which the ignition is initiated by an externally controlled igniter but is assisted by thermo-ignition; this mode of ignition has been indicated by the shading running from the lower left to the upper right. In the second mode of ignition the mixture is ignited by thermo-ignition, but in the course of the resulting explosion the externally controlled igniter is fired. This ignition is indicated by the cross-hatching.

From the diagrams of Fig. 5 it will be seen that during the regulation in range $m$ in the interval from 15 o'clock to 15:05, the discharge path for the residual gases having a minimum cross-section of approximately 11.9 cm², the range of ignition of the mixture by the externally controlled igniter aided by thermo-ignitions occurring during the course of the so-initiated explosions, the air temperature was approximately constant while the cooling oil temperature increased somewhat. The succeeding regulating condition in range $n$ was distinguished from that in range $m$ in respect to external influences upon the explosion chamber merely by increase in the heat content; that is, by increase in the amount of fuel fed per cycle. As a result, an increased amount of residual heat from the preceding explosion to the mixture destined for the next explosion was transmitted from the time 15:05 on. There now appear to an increasing extent thermo-ignitions in addition to the external ignition, the externally controlled ignition instant falling within the course of the explosions initiated by the thermo-ignition. From the rise of the curve 6, in spite of the fall of the curve 5, and from the constantly increasing number of thermo-ignitions which initiate the explosions, the tendency of the explosion chamber toward heating up of its walls and toward increasing the number of thermo-ignitions will be evident. If the processes in the explosion chamber were not interfered with, there would set in, as experience has shown, a process based upon pure thermo-ignition in which the thermo-ignitions would occur so early that the externally controlled ignition instant would lie later than the course of the explosions initiated by such thermo-ignitions; finally, in the course of operation with pure thermo-ignition, premature ignitions would develop, so that disturbances in the operation would be unavoidable. Heretofore the transition of thermo-ignition into premature ignition could be prevented only by the maintenance of definite proportions between the narrowest discharge path cross-section for the residual combustion gases, the scavenging time and the volume of the explosion chamber. The explosion chamber was constructed or the operating process was determined accordingly. On the other hand, any modification during the operation was impractical, and it was in fact considered to be out of the question to go out of the field of thermo-ignitions back into the field of externally controlled ignitions. This problem has, however, been solved in accordance with the invention as can be seen from the diagrams of Fig. 5. By increasing the narrowest discharge path cross-section at the instant represented by 15:09 o'clock from 11.9 to 23.8 cm$^2$ (see curve 4), initiation of the explosions purely by thermo-ignition is eliminated and externally controlled ignitions again participate in the initiation of the explosion. The curve 6 again falls somewhat, without the output of the chamber according to curve 7 diminishing. In spite of the fact that the heat content was still further increased at the instant 15:12 in the regulating range $p$, the range of explosions initiated by external ignition but supported by thermo-ignition is maintained in the new regulating condition. Thus, by change of the minimum discharge path cross-section for the residual gases of the explosion chamber, it is possible to control effectively the mode of ignition; in this way the possibility was for the first time presented of changing over from one mode of ignition at will to another during the operation of the chamber. With regard to the ignition process forming the basis of the invention, it is, in other words, possible to adjust the range of the mixed ignitions and maintain the same during the course of operation independently of changes in the heat content of the charge. It is, however, just as possible with the immediately above-mentioned mode of regulation to change over from the field of mixed ignitions into the field of pure externally controlled ignitions or pure thermo-ignitions, or from the field of pure thermo-ignitions into the field of purely externally controlled ignitions and conversely.

The above-mentioned mode of regulation according to the invention can also find application when the quantity of heat conducted to an explosion chamber, particularly the heat tone of the mixture introduced into the chamber, is increased for temporary overload. By temporary overload is meant an increased output which exceeds that produced at the highest efficiency of the plant, a certain drop in efficiency, for example, through scavenging losses, being then taken into consideration to enable the output to be temporarily increased to a considerable extent. According to the modes of ignition heretofore employed, such an operation was not capable of being carried out because it was not possible to alter the residual heat produced by the preceding explosions in the explosion chamber. The factors which determine the transfer of the residual heat to the newly incoming mixture or its components therefore always had to be so measured from the beginning as was requisite for operation with best efficiency. In consequence, however, of the pure thermo and externally controlled ignition which then appeared the increase in output could be effected only for so short a time that it was practically not capable of being utilized.

It is to be understood with reference to the above mentioned mode of regulation according to the invention that the possibility of altering the residual heat in the explosion chamber is not limited to the adjustment and carrying out of mixed ignitions. My new regulating process and the devices for carrying out the same can find application in whole or in part in various systems of ignition where it is desired to influence the factors and conditions which determine the nature, course or timing of the ignition. Thus, the measures proposed in my new mode of regulation can, for example, be employed in similar fashion to establish more favorable combustion conditions where the problem is to effect ignition of the mixture with pure self-ignitions while avoiding the danger of pre-ignitions. Similarly, certain features of the invention can be utilized to influence and regulate the conditions attending ignition by an externally controlled igniter in order that uniform combustion may be obtained and regular ignition assured.

Aside from the above described mode of regulation for maintaining that condition of the mixture which is required for carrying out the mixed ignition according to the invention, the ignition condition of the mixture can, in a further development of the invention, be controlled also in another manner. This development resides in the fact that the ignition condition of the mixture can be adjusted independently of its heat tone by adjusting at will the condition of the operating media of the explosion chamber. The term "operating media" is to be understood in its widest sense, because changes in the condition of the mixture to be ignited can be secured not only by changes in the condition of the supercharging air, but also by changes in the condition of the scavenging air or of the cooling agent of the explosion chamber. Proceeding from this standpoint, the second mode of regulation for carrying out the mixed ignitions according to the invention is characterized by changing the conditions of the operating media, whereby mixture conditions arise which result in mixed ignitions in the sense of the ignition process according to the invention.

During practical tests of this kind, temperature changes in the scavenging or supercharging air or in both media have proved to be particularly effective. If, for example, the explosions occurred in the range of purely externally controlled ignitions, the range of mixed ignitions with mutually assisting external and thermo-ignitions could be attained without difficulty by increasing the air temperatures, and finally even the range of pure thermo-ignition could be reached. Conversely, by reduction of the air temperature the ignitions could be displaced from the field of pure thermo-ignition into the desired range of mixed ignitions or even into the range of pure externally controlled ignitions.

Similar effects are exerted by increase of the moisture content of the scavenging or supercharging air or of both media. If the moisture content of the air is increased, the explosions can be displaced from the range of pure thermo-ignition into the range of mixed ignition, and by increasing still further the moisture content, the explosions can be displaced into the range of purely externally controlled ignitions; while decrease in the moisture content brings about the reverse effects.

The influencing of the ignition condition is, however, not limited to changes in the operating media, particularly the supercharging air, which are introduced into the combustion space of the explosion chamber. The desired ignition condition can also be secured when the conditions of the other operating media are changed, particularly the cooling agent of the explosion chamber. Changes in the cooling agent temperatures operate in the same manner as changes in the air temperatures. The courses of such regulating process is only somewhat slow because the effect of the cooling agent upon the mixture to be ignited does not occur directly but only through the heat-transmitting walls of the explosion chamber. It is possible also by a reduction of the quantity of cooling agent to pass over from the range of externally controlled ignitions into the range of mixed ignitions.

The second mode of regulation for obtaining the condition of the mixture necessary for mixed ignition can be accomplished in a great variety of ways. A particularly simple and advantageous manner appears, for example, to be the addition of hot or cold air into the main air stream and the mixing of both air streams before the introduction into the explosion chamber. Depending upon the proportionate quantities of the currents of hot or cold air introduced into the main air stream, the temperature of the scavenging or supercharging air introduced into the explosion chamber, or of both, can be altered. By the injection of variable quantities of water or of steam into the flowing air, and preferably in finely atomized form, the moistness of the scavenging or supercharging air can be varied in the simplest manner. The change in the cooling agent temperatures can advantageously occur in the same manner as the change in the air temperatures by adding variable quantities of hotter or colder cooling agent to the main cooling agent stream before entry into the cooling jackets. Finally, to secure changes in the amounts of cooling agent introduced or circulated per unit of time it is only necessary to vary the speed of rotation or the number of reciprocations per minute of the feeding or circulating pump for the cooling agent.

This second mode of regulation operates with particular advantage upon starting of the explosion plant, because by pre-heating the scavenging or supercharging air, or both media, and also by preheating of the cooling agent the range of mixed ignitions can be reached in the shortest possible time.

Figs. 6 to 10 illustrate the conditions of the operating media in different modes of ignition. Fig. 6 shows first of all how considerably the fluctuations in the heat tone, which is one of the factors coming particularly into consideration as determining the ignition condition of the mixture, affect this ignition condition. Without change in the conditions of the operating media in the sense of the present invention it would be difficult to adjust permanently the mixture condition required for accomplishing mixed ignitions or to maintain the same continuously, since changes in the heat tone are scarcely avoidable in view, for example, as already mentioned above, of the regulation of the output of the explosion chambers or of the gas turbine or turbines. The diagram of Fig. 6, which was obtained during investigations with an explosion chamber operated with heavy oil and having a volume of 0.075 cubic meter and a cycle frequency of 90 per min., shows in curve 8 the temperature of the scavenging and charging air before admission into the explosion chamber; the ordinates represent temperatures in degrees centigrade while the abscissae indicate time (measured from 11:06 o'clock). The curve 9 indicates the average temperature (the arithmetical mean between the inlet and outlet temperatures) of the cooling agent of the explosion chamber (cooling oil). Curve 10 shows the pressure increase obtained, that is, the pressure ratio $$\frac{p_1}{p_0}$$

$p_0$ representing again the charging or mixture pressure in the explosion chamber prior to the explosion, and $p_1$ the combustion gas pressure after the explosion of the mixture. Curves 11, 12 and 13 indicate the temperatures in the walls of the explosion chamber at the points $11_0$, $12_0$, and $13_0$ of Fig. 7, at which points the measurements were made, such chamber being provided with a fuel and air inlet member 14 and an outlet or exhaust member 15. The construction of the measuring places themselves is indicated in Fig. 8 which shows a thermo-element 16 projecting to the bottom of the bore 17 in a screw plug 18, that is, to the extent that X is equal to approximately 2 mm. at the inner surface of the wall of the explosion chamber.

The alscissa in Fig. 6 is divided into two ranges, one range $a_1$ with a given feed of fuel pump, and a range $b_1$ with a somewhat increased feed of the fuel pump as compared with the feed in range $a_1$. At the lower part of the diagram in Fig. 6 will be seen a surface shaded by lines running at 45° to the horizontal from the lower left to the upper right and comprising the operating range I, and a second area which is cross-hatched and represents range II, and finally an area representing range III and shaded by lines inclined 45° to the horizontal in the opposite direction to the shading of range I.

In the range I there exists the field of purely externally controlled ignitions, as will be recognized from the comparatively small pressure increases and low cooling agent and chamber wall temperature. When the quantity of fuel was increased at the beginning of the range $b_1$ at the time 11:10 and thereby the heat tone of the mixture increased, there appeared thermo-ignitions during the course of the explosions initiated by externally controlled ignitions, so that the range II of mixed ignitions set in. The curve of the pressure rise 10 reached its maximum in this range while the temperature curves, and particularly the curves 11, 12 and 13, moved very steeply upwardly. In spite of the fact that in range $b_1$ the operating devices were not manipulated in any way or the condition of the operating media changed there occurred automatically a transition into the range III of pure thermo-ignition. The pressure rise curve 10 turned sharply downward, while the curves 8, 11, 12 and 13 approached a turning point which corresponded to the condition of equilibrium. From the course of the curve 10 it will be seen that this automatic shifting of the ignition condition into the range III is not at all desirable, but that, on the contrary, efforts should be directed toward carrying out the ignition process represented by the range II by means of so-called mixed ignitions.

The measures proposed according to the invention for solving this problem for altering the operating media conditions are illustrated in the diagrams of Figs. 9 and 10. In these diagrams the ordinates again indicate the temperatures in degrees centigrade or the pressure ratio $$\frac{p_1}{p_0}$$

while the abscissae correspond to the time measured from 9:36 o'clock on. The curves 8 to 13 have the same significance as in Fig. 6. However, while in the tests represented in Fig. 6 the heat tone of the mixture was subjected to fluctuations by variations in the feed of fuel in the ranges $a_1$ and $b_1$, in the tests illustrated in Figs. 9 and 10 the heat tone was not subjected to any change, the feed of fuel in the whole range $c_1$ being kept constant. In spite of this fact it was possible, as Figs. 9 and 10 show, to leave the range of pure thermo-ignitions III at will and to realize the range of mixed ignitions II, or to leave the range of pure external ignitions I in order to obtain the range of mixed ignitions II. In the tests according to Fig. 9 which were carried out in accordance with the principles of the invention, the air temperature was changed, as is clearly indicated from the course of the curve 8. Upon consideration of the diagrams within the sections III and II, it will be seen that by fall of the air temperatures according to curve 8 in range II it was possible to emerge from the range of pure thermo-ignitions III into the range of mixed ignitions II. The maximum pressure increase ratio was likewise obtained in this range, as is shown by curve 10. On the other hand, comparison of the diagram ranges II and I will show that by increase of the air temperatures in range II as compared with the air temperatures in range I it is possible to leave the range of pure external ignitions I and to realize the desired range of mixed ignitions within the range II.

What has been said above in connection with the curves of Fig. 9 for the air temperatures according to curve 8 applies in a similar sense to the cooling oil temperatures represented by curve 9 in Fig. 10. By reduction of the cooling oil temperatures it is possible to shift from the range of pure thermo-ignitions III to the range of mixed ignitions II. Conversely by increase of the cooling oil temperatures the operation can be changed over from the range I of pure external ignitions to the range II of mixed ignitions.

When in the tests whose results are indicated in Figs. 9 and 10 the heat content was maintained constant, this was done particularly for the purpose of permitting the influence of air and cooling temperature changes upon the ignition conditions to be better ascertainable. In actual operation the conditions are frequently such that any one of the factors which determine the ignition condition of the mixture, such as the heat tone, may be altered, so that in the absence of measures corresponding to the processes described in connection with Fig. 6, an automatic change in the ignition condition would occur. This automatic change is opposed according to the invention by a corresponding change in the conditions of the operating media, as in the air or cooling medium temperatures or in both.

What has been said in connection with the air and cooling medium temperatures applies also, as above stated, to the changes in the quantities of cooling medium introduced or circulated per unit of time, and it is not believed to be necessary to show such relationship by means of diagrams as such diagrams will be similar to those discussed above.

The above explanation with reference to the temperature condition of the charging air and its moisture content, or with reference to the temperature conditions of the cooling agent or of its rate of flow, apply naturally also to other physical conditions of these media or of the other operating media that may come into consideration.

It will be evident that the condition not merely of one of the operating media but of a plurality of media can be altered, and not merely on condition of any particular operating medium. The conditions of several operating media can be simultaneously changed with the same effect; also the condition of an operating medium can be subjected to change in various directions.

It should be mentioned that the above proposed measures (change in the scavenging process for the residual combustion gases of a preceding explosion on the one hand, and/or change of the conditions of the operating media on the other) for stabilizing the explosion phase with mixed ignitions can be realized with complete certainty only with some difficulty. To obtain completely satisfactory operation, the measures for the various modes of regulation in question must be made independent of the will of the mechanic, that is, they must be carried out automatically. If the control of the ignition were made to depend on constant inspection of the ignition condition there would arise the danger that as a result of imperfect observation and inadequate and incorrect measures for stabilizing the operation with the mixed ignition, errors in control would frequently occur. To avoid these errors the present invention proposes, for the purpose of perfecting the explosion process with mixed ignitions according to the invention with a view toward stabilizing such mode of ignition, to carry out the desired automatic control of the factors determining the character of the ignition in dependence upon the changes in the explosions effected by the ignitions. I have discovered that the mode of ignition influences fundamentally the character of the explosions produced by it, so that changes in the explosions can be utilized to equalize the automatic tendency of the explosion chambers toward change in the mode of ignition, and thus to stabilize the ignition.

Regulating impulses are accordingly brought into action automatically in dependence upon changes in the character of the explosion occurring during operation, such impulses being made to act upon certain factors which determine the character of the ignition, so as to secure stabilization of the ignition during the whole period of operation of the chamber.

In Figs. 11 to 32 is shown a series of embodiments and examples of constructions for carrying out the above-described mode of ignition according to the invention with mechanism for controlling the ignition automatically. The automatic ignition controller comprises a housing 5' (Figs. 11 to 13) whose cylindrical bore 7' receives a double piston slide valve 6'. Oil under pressure constantly acts upon the upper piston surface 8' of the slide valve 6', such oil being fed by the conduit 9' and channel 10'. The opposite lower piston surface 11', on the other hand, is constantly under the influence, through conduit 12', of the combustion gases generated in the explosion chamber A, as is shown more clearly in Figs. 29 and 30. As soon as these combustion gases reach a predetermined pressure, for example, 12 atm. gauge, the oil pressure acting upon the upper piston surface 8' of the valve 6' is overcome and the valve is moved into its upper position indicated in Fig. 11. In this position the valve 6' connects the channels 13' and 14' in the wall of the bore 7' through the annular space surrounding the reduced middle portion of the valve, so that the pressure oil introduced through conduit 9' flows through the lateral opening 15' in the wall of the cylinder bore 7' transversely to the axis of the valve and into the central annular groove 16' of the rotary member or valve 18' which is likewise mounted in the housing 5' with its axis parallel to that of the slide valve 6'. This rotary valve is driven through a gearing 17' (see also Fig. 29) by the driving motor R which simultaneously drives the control mechanism O for actuating the control members (inlet and outlet valves) of the explosion chambers and also the pressure fuel oil pump S. The annular groove 16' of the rotary valve 18' is in constant communication through the axial bores 19 and 20 in the walls of the groove with the arcuate grooves 21 and 22 on the periphery of the rotary valve, the groove 21 lying in a plane above the groove 16', and the groove 22 lying in a plane below the groove 15'. The arrangement and size of the grooves 21 and 22 are shown clearly in Figs. 12 and 13. As soon as the grooves 21 and 22, during the rotation of the valve 18', come into registry with the bores 23 and 24 in the wall of the housing of the controller, that is, with the conduits 25 and 26 connected thereto, oil under pressure enters such conduits. These conduits 25 and 26, as will be more fully described hereinbelow, are connected with control devices which are designed to influence the character of the ignition. Figs. 12 and 13 show that additional grooves 27 and 27a are provided upon the periphery of the rotary valve 18', such grooves lying in the same planes as the grooves 21 and 22, and being connected through radial bores 28 and 28a, respectively, with the hollow interior 29 of the valve and through such interior with a discharge conduit 30 for the regulating oil. The grooves 21 and 27 on the one hand and grooves 22 and 27a on the other, form separate control sections. Each of these control sections has four control edges; the control section shown in Fig. 12 has the control edges 31, 32, 33 and 34, while that shown in Fig. 13 has the control edges 35, 36, 37 and 38. The control edges 32 and 36 of both sections are so disposed that in all the explosions occurring prior to the limiting diagram shown in heavy lines in Fig. 2, that is, in all the explosions initiated by pure thermo-ignitions, the bores 23 and 24 have already been passed by, so that the passage for the pressure oil to the control devices influencing the character of the ignition described hereinbelow is uncovered. For purely constructional reasons the control edge 32 is further advanced than the control edge 36 without, however, influencing the mode of operation. Every explosion initiated by pure thermo-ignition brings about the result that the ignition controller permits pressure oil to flow through both the conduit 25 and the conduit 26, and thus releases control impulses to an amplified degree. The action of these control impulses or regulating forces will be described below.

The control edge 31 in the control section represented in Fig. 12 is so disposed that it closes the port 23 in all explosions occurring after the limiting diagram shown in full heavy lines in Fig. 2, and thus prevents the flow of pressure oil to the control device connected with such port through the conduit 25. Various forms of control devices are described below. Finally, the control edge 35 is so disposed that in all explosions occurring after the limiting diagram shown in thin lines in Fig. 2, in which diagram the explosions are initiated simultaneously by external and thermo-ignition, it has already closed the bore 24 and thus prevents the flow of pressure oil to the control device connected with the port 24 through conduit 26, so that the said control device is no longer actuated. Consequently, in all explosions occurring prior to the limiting diagram shown in heavy lines in Fig. 2, regulating impulses of an amplified degree are transmitted, as already mentioned, by the passage of pressure oil into both conduits 25 and 26. In all explosions, on the other hand, which fall within the range of mixed ignitions, and hence between the curve sections b and g of the two curves in Fig. 2, impulses of smaller strength and influence are exerted, while, finally, in all explosions occurring after the thin line limiting curve of Fig. 2 no regulating impulses are transmitted. As soon as the control edges 34 and 38 of both control sections pass by the ports 23 and 24, the grooves 27 and 27a are brought into connection with the discharge space 29 and thus with the ports 23 and 24 through the associated radial ports 28 and 28a, respectively. The pressure oil then flows off from the conduits 25 and 26, so that the devices actuated by the regulating impulses return to their initial positions.

In the ignition controller according to Figs. 11 to 13 the switch device represented by the slide valve 6' and responsive to a definite explosion pressure, operates together with a control device 18' which, in correspondence with the time position of the definite explosion pressure (for example 12 atmos. gauge) with respect to the externally controlled ignition point, causes regulating impulses to go into action or in certain cases does not permit such forces to act. With increase of the time interval between the appearance of the definite explosion pressure and the externally controlled ignition instant, regulating forces of greater or smaller effect are caused to act by the control device 18' upon the factors determining the ignition process. For in all explosions which lie in advance of the limiting diagram shown in heavy lines in Fig. 2 the definite explosion pressure occurs at longer time intervals from the externally controlled ignition instant than in those explosions which occur in the optimum ignition range between the two limiting diagrams of Fig. 2. In order to maintain this desired type of ignition leading to such explosions, a smaller degree of interference with the control devices is naturally necessary than in those explosions which arise due to pure thermo-ignition and therefore, as viewed in the diagram according to Fig. 2, lie in advance of the heavy line limiting diagram, that is, correspond approximately to the diagram k in Fig. 4.

In the embodiment of the ignition controller shown in Figs. 14 to 18, the controller comprises a housing 39 in whose cylindrical bore 40 is arranged a piston valve 41 movable axially therein. The explosion gases act against the under surface 42 of the valve 41, the gases being admitted through the pipe 12' (see Fig. 19) leading from the explosion chamber. The upper surface 44 of the valve, on the other hand, is subjected to the action of pressure oil. The piston valve 41 is provided with annular grooves 45 and 46 through which the valve connects the ports 47 in housing 39 when in the position shown in Fig. 15, while in the position according to Fig. 16 the valve brings not only the ports 47 but also the ports 48 into communication with each other. In the Fig. 14 position, on the other hand, the valve closes both sets of ports. The pressure oil conduits 9' are connected to the ports 47 and 48 at one side, while the conduits 25 and 26 are connected to such ports at the other side.

The different piston valve positions shown in Figs. 14 to 16 are brought about under the action of the control device which consists of a rotary valve 49 driven through bevel gear 17' from the elongated shaft of the motor R or of the oil pump S of Fig. 29. The rotary valve 49, as shown in Figs. 17 and 18, has two grooves 50 and 51 which are in or out of communication with the ports 56 and 57 depending upon the position of the valve, the grooves having the limiting edges 52, 53 and 54, 55, respectively. Ports 58 and 59 connect the grooves 50 and 51 with the pressure oil space 60 of the valve 49 to which pressure oil is conducted by conduit 61. The operation of this type of ignition controller is as follows:

In all explosions which occur in advance of the heavy line limiting diagram of Fig. 2 the ports 56 and 57 have not yet been closed by the control edges 52 and 54 of the rotary valve 49. As soon as the predetermined explosion pressure is reached, which causes movement of the piston valve 41 against the action of the pressure oil admitted through ports 56 and 57, the piston valve 41 is raised into the position shown in Fig. 16. The pressure oil in the space 62 is expelled without difficulty through the ports 56 and 57, the grooves 50 and 51 and the ports 58, 59 into the pressure oil space 60 and through the latter into the oil conduit 61. In the highest position (see Fig. 16), the valve opens the ports 47 and 48, so that oil enters both control conduits 25 and 26 and actuates the attached control devices.

On the other hand, in all those explosions which occur after the heavy line limiting diagram of Fig. 2, but still before the thin line diagram, that is, in all explosions initiated by mixed ignition, the control edge 52 has already closed the port 56. The control edge 54 has, however, not yet covered the port 57. When, therefore, the piston valve 41 is again thrown upwardly under the action of the pressure of the explosion gases after the latter have reached a predetermined explosion pressure (for example 12 atmos. gauge) it can return the pressure oil occupying the space 62 only through the port 57, and indeed only until it has reached the Fig. 15 position in which it covers the port 57. The valve can no longer displace the remainder of the pressure oil in the space 62 since the port 56 has already been closed by the rotary valve 49, so that it takes the position shown in Fig. 15. In such position the valve connects the ports 47, so that pressure oil flows only through the control conduit 26, while no pressure oil reaches the conduit 25.

Finally, in all those explosions which occur after the thin line diagram of Fig. 2, the control edges 52 and 54 have already shut off the ports 56 and 57; the pressure oil trapped in the space 62 thus prevents upward movement of the valve 41. The latter thus remains stationary in the position shown in Fig. 14 even though the explosion pressure has reached the predetermined value required for overcoming the pressure of the oil, the control devices connected with the conduits 25 and 26 then remaining unactuated.

Upon further rotation of the control mechanism 49 the control edges 53 and 55 open the ports 56 and 57, so that oil under pressure again enters the space 62 first through the port 56 and then through the port 57 and forces the piston valve 41 back into its initial position shown in Fig. 14 against the reduced pressure in the explosion chamber, which is now the pressure of the residual gases or of the scavenging air, if it has been moved from such position.

The conduits 25 and 26 may become relieved of pressure oil once the oil has reached them from the conduits 9' in any suitable manner. Thus the pressure may be slowly relieved by way of any non-leak-proof joints or by specially provided small leakage ports when the supply of oil under pressure is cut off. For example, the actuating pistons of the valves 138 and 139 shown in Fig. 29 and described hereinbelow are never completely oil-tight, and consequently upon the cessation of the feed of oil under pressure slowly return to their previous position under the spring pressure. The same is true of the actuating pistons of the valve 114 in Figs. 33 and 34 described hereinbelow.

Figs. 19 to 21 show an explosion turbine plant constructed according to the invention for carrying out my improved ignition process. In such plant the ignition, that is, the mixed ignition is stabilized by effecting an automatic regulation of the narrowest discharge path cross-section for the residual combustion gases of the preceding explosion and thereby effecting an automatic regulation of the scavenging phase, which gives rise to conditions of the mixture leading to the initiation of mixed ignitions, in time dependence upon changes in the appearance of definite explosion pressures in relation to the external ignition instant. The parts of the plant corresponding to those of the plant shown in Fig. 1 have been designated with the same reference characters. Thus in Figs. 19 to 21 the letter A again indicates the explosion chamber provided with the scavenging air inlet B, the supercharging air valve D, the fuel injection valve C, the outlet member H, also called the nozzle valve, the auxiliary outlet valve J for the gases displaced by the scavenging air, and the external igniters $G_1$, $G_2$. The combustion gases generated in the explosion chamber flow into channel 60 70 and nozzles 71 upon opening of the nozzle valve H, and strike the two-ringed Curtis wheel $T_1$ of the first turbine stage, and thereafter strike the two-ringed Curtis wheel $T_2$ of the second stage. The exhausted gases are discharged through the pipe L. Between the two turbine stages there is arranged a pressure equalizer K. The nozzle valve H being closed, the residual combustion gases are expelled by the scavenging air entering through the opened valve B and escape through the open auxiliary valve J and pass through conduit M to the nozzle chamber 78 from which they pass into the nozzles 79 and 73 which direct them against the blades of the second stage $T_2$ of the turbine.

According to the invention there are arranged in the nozzle chamber 78 (see Fig. 20) two controlled members which are operable to vary the available minimum section of flow for the residual gases (e. g., the nozzle throat areas). These members may be regarded as control devices as they serve merely for automatically regulating the narrowest outlet cross-section and thus regulate the ignition operation. These control devices consist of two valves 80 and 81 which are arranged to open or close the additional nozzles 82 and 83 which, like the nozzle 79, are arranged in advance of the turbine T₂. The cutting in and out of these additional nozzles is carried out from the ignition controller by way of the valves 80 and 81, such controller being constructed as shown in Figs. 11 to 13; this controller can naturally be constructed also in accordance with Figs. 14 to 18 or in any other suitable manner. The regulating forces or impulses exerted by the controller 5' in the manner already described in the form of pressure oil admitted to the conduits 25 and 26 bring about the result, considering for example the impulse transmitted through the conduit 25, that pressure oil enters under the control piston 84 of the valve 81. In this way the valve 81 is opened against the pressure of the spring 85 and the nozzle segment 83 thus cut in. The cross section of flow available to the residual gases and normally afforded by the nozzle segment 79 is thus increased, in consequence of the impulse emanating from the ignition controller 5', by the throat cross-section of the nozzles 83. In similar fashion a pressure oil impulse released by the controller 5' into the conduit 26 operates upon the auxiliary valve 80, so that the nozzles 82 are connected in parallel with the flow area afforded by the nozzles 79.

It has already been mentioned that upon the occurrence of thermo-ignition, which, viewed in Fig. 2, take place in advance of the heavy line limiting diagram, both conduits 25 and 26 receive pressure oil from the controller 5'. When, therefore, explosions occur which are initiated purely by thermo-ignition, both valves 80 and 81 are opened, so that the minimum cross section of the nozzle or nozzles 79 is very considerably increased by the cutting in of the nozzles 82 and 83. In this way the amount of hot residual gases trapped in the explosion chamber A during the next cycle is very considerably reduced and thereby the temperature effects upon the combustible mixture is correspondingly diminished. The mixture therefore no longer inclines toward pure thermo-ignition, and ignitions under the control also of the external igniter set in, so that the above-described mixed ignition comes into play. Should the effect resulting from the increase of the narrowest flow cross-section prove to have been too great, so that thermo-ignitions no longer occur and the ignition has been displaced into the field of purely externally controlled ignition, then the tendency of the explosion chamber operation, upon corresponding adjustment, toward the side of pure thermo-ignition insures that thermo-ignition will again appear in the next cycles, so that the range of mixed ignitions is reached. In order to maintain this range, the ignition controller 5' again opens the conduit 26, as was explained in the description of the controller in connection with Figs. 11 to 13, so that the additional flow area presented by the nozzles 82 is cut in. In this manner the ignition, which upon the setting in of mixed ignitions again has a tendency to change over automatically into the range of purely external ignition, is kept with certainty within the range of mixed ignitions, so that the ignition controller offers double security. Provision is thus made not only for keeping the ignition always in the range of mixed ignitions, but a second source of security is created in that once the ignition has gone over into the field of pure thermo-ignition or falls in such field from the beginning the automatic return of the ignition to the field of mixed ignitions up into the field of external ignition is brought about.

The ignition controller 5' receives the pressure oil through conduit 9' from a pump S (Figs. 20 and 26) which provides the oil pressure distributor O with oil in known manner. The combustion gases which actuate the piston valve 6' in the controller 5' are introduced by the conduit 12' which opens into the explosion chamber A at 88 (Fig. 19). The ignition controller is driven by the motor R through the bevel gears 17', such motor simultaneously driving the rotary member P of the distributor O. The discharged regulating oil returns into the oil supply tank 91 through conduit 30, from which tank the pump S sucks the required quantity of oil through the pipe 92.

It is naturally not necessary for the ignition controller to be built separately from the control or regulating devices which it controls. It may be formed as a single constructional unit with such devices, as is shown in Figs. 22 to 25. The parts of Figs. 22-25 corresponding to parts shown in Figs. 19 to 21 are designated with the same reference characters. The rotating slide or valve 18' is positioned horizontally and rotates in the described construction in two bushings 94 and 95 (Fig. 24) which are rotatable during the operation and are provided with control ports 93 (Fig. 23). By rotation of these bushings, and thus of the control ports 93, the control instants of the controlling edges 31 and 35 can be displaced. It is thus possible to make exact adjustment for the most favorable ignition operation. The rotation of the bushings 94 and 95 is effected through pinions 96 and 97 (Fig. 24) which engage each a gear 98 or 99 attached to or integral with the bushings 94 and 95. The pinions 96 and 97 are actuated through the square shafts 100 and 101 and are fixed in the desired position by means of nuts 102 and 103. The pressure oil which arrives through the port 15' by way of conduit 9' in consequence of a corresponding adjustment of the piston valve 6' and enters the middle annular groove 16' of the rotating valve 18' flows out of the groove 16' through ports 19 into the central bore 20; from the latter it passes through the ports 104 and 105 into the grooves 21 and 22 of the valve 18'. Upon suitable adjustment of the rotary valve 18' and the bushings 94 and 95 the pressure oil flows through the control ports 93 which are displaced with the bushings into the recesses 23, 24, (the latter of which is not illustrated). The admitted pressure oil passes through conduits 25, 26 (the latter of which is not shown), in which spring-loaded check valves 106 are arranged, and reaches under the control pistons 84 of the valves 80 and 81. The pistons 84, unlike those shown in Fig. 20, are not spring-pressed but are under constant oil pressure which bears upon the differential surface 107. The pressure oil required for this purpose is constantly charged by the pump S (see Fig. 20) through the pipe 108 (Fig. 33). The check valves 106 present to the pressure oil in the direction of the valve 80 and 81 only the usual flow resistance but prevent however, an automatic return of such oil to the rotary valve 18' when the latter assumes a discharge position. In order, however, to enable the valves 80 and 81 to return to their closed position there is presented to the exhausted oil a discharge in the direction of the rotary slide valve 18' through the ports 109 through the throttling ports 110 which are adjustable during the operation, and through the central channels 111 of the check valves 106. By reduction of the throttling cross-section 110 through the adjustable needle 112 the closing velocity of the valves 80 and 81 can be brought to any desired value. If the closing movement is not completed in the time available in a cycle then such closing occurs in the next or in one of the next cycles provided that the valves have not in the meantime been again actuated. By means of the nut 113 (Fig. 23) the throttling screw 112 can be fixed in the desired position. The exhausted pressure oil flows from the rotary valve 18' through the discharge channel 27, chamber 29 and conduit 30. The whole housing 114 in which the valves 80 and 81 together with the ignition controller 5' are arranged is positioned in this form of the invention with its mounting 115 attached either directly upon the residual gas conduit M (see Fig. 33) or it is connected with such conduit by a separate pipe. The additional nozzles 82 and 83 are attached to the flange 116, the leak oil conduits being designated by the numeral 117.

Figs. 33 and 34 show an organization view which includes the parts shown in Figs. 22 to 25. The housing 5' in Fig. 33 corresponds to that shown in Fig. 22 which is provided with channels similar to those shown in Fig. 11 and correspondingly designated. The housing 5' of Fig. 22 is however provided with the drain conduit 117 which prevents oil from passing along the piston 6' into the combustion gas conduit. To this end the piston 6' is provided with an axial bore 19' into which the leakage oil collecting in the groove 20' passes by way of the bore 21', the oil then flowing through the bore 22' into the annular groove 123 into which the conduit 117 opens.

Figs. 26 to 28 illustrate an explosion turbine in which the ignition controller 5' automatically regulates the scavenging period, the latter being the factor determining the nature of the ignition, in time dependence upon changes in the occurrence of definite explosion pressures in relation to the externally controlled moment of ignition. The moment of opening of the auxiliary exhaust valve J is maintained fixed in this form of the invention, the moment of closing however being displaced automatically in dependence upon changes in the explosions. This displacement is accomplished by rotation of the bushing 118, provided with a slot 119 which determines the moment of closing of the valve J. The bushing 118 is rotated by a piston rod 121 whose groove 122 (Fig. 27) is engaged by an arm 120 fixed to the bushing. A piston 123 is fixed to the rod 121 while a piston 124 is axially movable upon such rod; piston 124, however, carries with it the rod 121 by engaging a shoulder 125 on the rod when such piston acts under the influence of the pressure oil admitted through the conduit 26. The piston 123 has a stroke indicated by a'' in Fig. 27, while the piston 124 has a stroke indicated by b'', which is approximately half of the stroke a''. Both pistons are pressed by a spring 126 into their upper positions, shown in Fig. 27, when no pressure oil fills the conduits 25 and 26. The two working spaces 127 and 128 are thus connected, as already mentioned, through conduits 26 and 25, respectively, to the outlet ports 22 and 23 for the pressure oil in the ignition controller 5' (see Figs. 11 to 13). If the piston 124 now receives an impulse in the form of a jet of oil through conduit 26 from the outlet port 24 of the controller 5', the bushing 118 rotates through the angle $\beta$; the scavenging period is therefore increased by the angle $\beta$, measured in angular units, since the moment of closing of the valve J has been retarded by the angle $\beta$. If the piston 123 also receives an impulse through pressure oil discharged through the port 23 of the ignition controller by way of conduit 25, the angle of rotation of the bushing 118 is increased still further by the angular distance $\alpha - \beta$, so that the scavenging period is again increased by the same amount, measured in angular units. Consequently, in all explosions which lie in advance of the heavy line limiting diagram of Fig. 2 the scavenging period is increased by the angle $\alpha$, and in all explosions which take place in the favorable zone between the two limiting diagrams of Fig. 2 it is increased by a period corresponding only to the angle $\beta$. On the other hand, in all explosions which lie after the thin line curve of Fig. 2 no increase in the scavenging period occurs.

While the above described embodiments of the invention show arrangements in which the operating devices of the explosion turbine plant are directly manipulated, such manipulation occurring either in the normal control devices, as for example, in the auxiliary exhaust valve J or in a control mechanism provided deliberately for the purpose of controlling the mode of ignition, which are thus to be regarded as ignition control mechanisms, such as, for example, the additional nozzle valves 80 and 81, in the embodiments of the invention about to be described the manipulation is effected upon the control devices (or, more correctly stated, the regulating devices) which are provided only for the purpose of influencing the conditions of the operating media. There will first of all be described a device for changing the temperature of the supercharging air, reference being had to Fig. 29. In addition to mechanism already described, this figure shows a scavenging air compressor 129, a supercharging air compressor 130 and the driving steam turbine 131. This turbine may be driven by means of steam generated in known manner with the waste heat of the plant as within a steam generator 131' (Fig. 29). Within the conduit 132 which leads the supercharging air to the valve D there is arranged a preheater 133 having a heating coil 134. In the by-pass conduit 135, which is connected with the compressor 130 by way of the Y connection 136, there is arranged a valve chest 137 containing two control valves 138 and 139. If the valves 138 and 139 are not actuated, the supercharging air delivered by the compressor 130, upon opening of the valve D, flows through connection 136, preheater 133 and conduit 132 into the explosion chamber A. The air is thus heated to a more or less definite temperature in the preheater 133. As soon, however, as the valve 139 or both valves 138 and 139 open under the influence of the ignition controller 39, a relatively cold, parallel stream of air flows through pipe 135 and mixes in the conduit 132 with the heated air coming from the preheater 133, so that the temperature of the supercharging air can thus be reduced to a lesser or greater extent. In correspondence with the changes in the explosions in the chamber A, either the control member 139 alone or both control valves 138 and 139 or neither valve becomes actuated; the temperature of the supercharging air accordingly changes considerably, or comparatively little or not at all, so that the ignition can be taken out of the range of pure thermo-ignition into the range of mixed ignitions, or maintained in the range of mixed ignition.

Fig. 30 shows a different form of the invention in which, not the temperature of the supercharging air, but the moisture content of the scavenging air is varied. To this end there is arranged a moisture controller in the conduit 140a leading to the scavenging valve B. The moisture controller consists of a mixing chamber 141, two injection nozzles 142 and 143, a water conduit 144 under pressure, and actuating mechanism 145, 146 for the two injection nozzles operated by oil under pressure charged by the conduits 25, 26. Depending upon the character of the explosions in the explosion chamber A the ignition controller 5' either opens neither of the injection nozzles or only the nozzle 143 or both nozzles 142 and 143. There is thus injected either no water at all, or only a small quantity of water, or a considerable amount of water under pressure in finely atomized form into the current of scavenging air, and thus the moisture content of the scavenging air charged by the compressor 129 through pipe 140 is regulated. A large moisture content in the scavenging air is able to take the ignition out of the range of pure thermo-ignition into the range of mixed ignition or even into that of purely externally controlled ignition; a small moisture content, on the other hand, can oppose the automatic tendency of the explosion chamber toward thermo-ignition, so that the range of mixed ignition sets in and is maintained.

Fig. 31 shows an arrangement in which the ignition controller 5' controls the temperature of the cooling agent of the explosion chamber A. A circulating pump for the cooling agent is shown at 147, such pump being driven by the motor R. The heated cooling agent is cooled in a cooler 148, the heated cooling medium flowing through the coil 149 or the coils 149, 150. The cooling agent is conducted to the cooling jacket 151 of the explosion chamber through conduit 152, while the heated cooling agent is sucked through conduit 153 into the coil 149 by the pump 147. A valve chest 155 is disposed in the suction conduit 154 of the pump and houses the two control valves 156 and 157. The cooler 148 receives a cooling agent through pipe 158 and discharges the same through pipe 159 in heated condition. The cooling agent for the explosion chamber thus flows from the pump 147 through the conduit 152 cooling jacket 151, conduit 153 and coil 149. From the latter it is withdrawn at the point 160 and reaches the pump by way of conduit 154. The cooling agent is more vigorously cooled upon passing through the coil 150, and a portion of the cooling agent passes through such coil when one or both of the valves 156 and 157 is open, the cooling agent flowing to such valves by way of pipe 161, and reaching the conduit 154 by way of pipe 162. The valves 156 and 157 are controlled from the ignition controller 5' through the conduits 26 and 25, respectively, so that, depending upon the course of the explosion in the chamber A, neither of the control valves, or only the valve 156, or both valves 156 and 157 are opened. The main stream of cooled cooling agent flowing through the pipes 149, 160 and 153 thus receives either no admixture of more vigorously cooled cooling agent, or only a small amount, or a considerable amount of the latter, so that the temperature of the main stream of cooling agent is either not reduced at all, or reduced only slightly, or reduced considerably. The quantity of cooling agent itself, however, remains unchanged. Large reductions in the cooling agent temperature effect a displacement of the ignition range from that of pure thermo-ignition into that of mixed ignition; smaller reductions in such temperature oppose the tendency toward automatic transition from the mixed ignition range into that of pure thermo-ignition.

Fig. 32 shows a construction in which the ignition controller 5' alters the rate of flow of cooling agent. The parts corresponding to parts shown in Fig. 31 are indicated by the same reference characters. However, in the construction shown in Fig. 32 the circulating pump 147 is driven by a separate motor 163. A resistance 165 is located in the circuit 164 of the motor, such resistance being regulated by the lever 166. The latter is actuated by an arm 120 controlled by a device which is built exactly like that which actuates the arm 120 of the bushing 118 in Figs. 26 to 28. The mode of operation of this device is thus the same as that of Figs. 26 to 28, so that further description thereof is unnecessary. Depending upon the nature of the explosions in the chamber A, the resistance remains unaltered, or is only partially reduced (say approximately one half) or is completely cut out by actuation of the lever 166. In this way the voltage across the motor 163 is either not altered at all, or increases a small amount, or increases by a considerable amount. The speed of the motor 163 is thus either kept constant or increases by a small or large amount. In the same way the flow of circulating cooling agent is varied. Upon large increase in the amount of circulated cooling oil the ignition range is shifted out of the range of pure self-ignition automatically into that of mixed ignition; with smaller increase in the quantity of cooling agent the constant tendency toward automatic shifting of the ignition from the range of mixed ignition into that of pure thermo-ignition is opposed.

It is within the scope of the present invention to actuate a number of different regulating or control devices from the same ignition controller. Variations in the construction of the ignition controller and the control and regulating devices actuated thereby can be resorted to within the scope of the appended claims without departing from the spirit of the invention.

It is to be understood that the above described measures and constructions for automatic adjustment and maintenance of the mixed ignition in accordance with the invention are not limited to this particular mode of ignition; they can be employed for stabilizing every other mode of ignition, particularly those employed in constant volume explosion processes, such as, for example, pure thermo-ignition or externally controlled ignition.

Where in the claims I employ the term "thermo-ignition" such term is to be understood to mean the type of self-ignition described herein; namely an ignition caused by the transfer of heat from external sources to the explosive mixture, or to one of its components, in the explosion chamber, such external sources including the various means and measures which receive heat as a result of previous explosions in the chamber. This type of self-ignition, which I term "thermo-ignition" is thus distinguished from the self-ignition that ocurs in piston engines of the Diesel type wherein the ignition is effected by heat resulting from the high compression. Although the source of the heat in thermo-ignition is different from that in the case of a Diesel engine, the two types of ignition have this in common, that the ignition takes place over a relatively large area or volume, as contradistinguished from the more or less point-like ignition accomplished with the aid of controlled external igniters like spark plugs.

I claim:

1. The method of producing mixed ignitions in an explosion chamber provided with an externally controlled igniter, which comprises introducing air and fuel into the chamber, and controlling the rate of temperature rise in the combustible mixture in the chamber prior to ignition to cause the thermo-ignition to occur in such time relation to the externally controlled ignition instant that one of the ignitions occurs during the course of the explosion initiated by the other ignition.

2. The method according to claim 1, wherein the control instant of the external igniter is maintained constant with reference to the working cycle of the chamber, and including the step of controlling the amount of heat transferred to the combustible mixture so that such mixture reaches or just passes the thermo-ignition point at the moment of operation of the external igniter.

3. The method according to claim 1, including the step of transferring heat to at least one of the components of the mixture with the aid of which the mixture reaches or just passes the thermo-ignition point at the moment of operation of the external igniter.

4. The method according to claim 1, including the step of transferring residual heat from a preceding explosion to at least one of the components of the mixture to such an extent that the mixture reaches or just passes the thermo-ignition point at the moment of operation of the external igniter.

5. The method according to claim 1, including the step of transferring a regulated amount of residual heat from a preceding explosion to at least one of the components of the mixture to such an extent that the mixture reaches or just passes the thermo-ignition point at the moment of operation of the external igniter.

6. The method according to claim 1, including the steps of expelling the residual combustion gases with scavenging air and regulating the amount of gases trapped at the discharge end of the chamber and thereby transferring a regulated amount of residual heat from a preceding explosion to at least one of the components of the mixture to cause the explosive mixture to reach or just pass the thermo-ignition point at the moment of operation of the external igniter.

7. The method according to claim 1, including the step of expelling the residual combustion gases with scavenging air, varying the minimum flow area available to the residual gases expelled from the chamber during the scavenging thereof to regulate the amount of gases trapped in the chamber and thereby transferring a regulated amount of residual heat from a preceding explosion to at least one of the components of the mixture to cause the explosive mixture to reach or just pass the thermo-ignition point at the moment of operation of the external igniter.

8. The method according to claim 1, including the steps of expelling the residual combustion gases with scavenging air, regulating the duration of the scavenging of the residual gases so as to trap a definite amount of residual gases at the discharge end of the chamber and thereby transferring a regulated amount of residual heat from a preceding explosion to at least one of the components of the mixture comprising the next charge to cause the explosive mixture to reach or just pass the thermo-ignition point at the moment of operation of the external igniter.

9. The method according to claim 1, including the step of controlling the physical condition of an operating medium of the chamber affecting the quantity of heat transferred to the explosive mixture prior to ignition in order to establish the condition of the mixture leading to mixed ignition.

10. The method of controlling the ignition of successive combustible charges in a constant volume explosion chamber to secure maximum combustion efficiency, which includes the step of regulating at least one of the factors determining the degree of heat transference to a newly admitted charge, prior to the explosion of the latter, in dependence upon changes in the physical condition of the combustion gases in the explosion chamber at a definite moment in a previous cycle.

11. The method of controlling the ignition of successive combustible charges in a constant volume explosion chamber to secure maximum combustion efficiency, which includes the step of regulating at least one of the factors determining the degree of heat transference to a newly admitted charge, prior to the explosion of the latter, in dependence upon changes in the physical condition of the combustion gases in the explosion chamber at a definite moment in a previous cycle, said factor being regulated in accordance with changes in the time interval between the occurrence of definite explosion pressure and the instant of operation of an externally controlled igniter.

12. The method of controlling the ignition of successive combustible charges in a constant volume explosion chamber to secure maximum combustion efficiency, which includes the step of regulating at least one of the factors determining the degree of heat transference to a newly admitted charge, prior to the explosion of the latter, in dependence upon changes in the physical condition of the combustion gases in the explosion chamber at a definite moment in a previous cycle, said factor being regulated in accordance with the shifting of the dividing zone between the incoming charge and hot residual gases trapped in the chamber.

13. The method according to claim 10 wherein regulating impulses are generated in dependence upon changes in the value of the explosion pressure at said definite moment in a previous cycle, said factor being influenced through such impulses.

14. The method according to claim 10 wherein regulating impulses are generated in dependence upon changes in the value of a physical condition affected by the explosions, and causing such impulses to effect control of said heat transfer determining factor.

15. The method of effecting ignition of successive combustible mixtures confined within a constant volume explosion chamber provided with an externally controlled igniting element, which comprises trapping a portion of the residual gases of the preceding explosion at the outlet end of the chamber, initiating the ignition with one of the two igniting elements consisting of the aforementioned element and said residual gases, and causing the other element to effect ignition during the course of the explosion following the initial ignition and thereby obtaining mixed ignition of the mixture.

16. Apparatus for controlling the ignition in constant volume explosion chambers provided with an externally controlled igniter, including mechanism for controlling the inlet and outlet valves of said chamber and timed to cause trapping of a part of the residual gases of the preceding explosion at the outlet end of the chamber, said residual gases transferring heat to the incoming charge, and means responsive to the character of the explosion for regulating the conditions affecting the degree of heat transfer to a combustible charge and thus effect timing of the thermo-ignition of the combustible mixture within the chamber with reference to the moment of operation of the externally controlled igniter so as to effect mixed ignition, wherein one mode of ignition is brought into action during the period of the explosion effected by the operation of the other mode of ignition.

17. Apparatus for controlling the ignition in constant volume explosion chambers provided with an externally controlled igniter, including mechanism for controlling the inlet and outlet valves of said chamber and timed to cause trapping of a part of the residual gases of the preceding explosion at the outlet end of the chamber, said residual gases transferring heat to the incoming charge, control mechanism for altering the physical condition of one of the operating media of the chamber influencing the thermal condition of the combustible charge prior to ignition, and means responsive to the pressure of the exploded gases and, when the explosion pressure indicates non-mixed ignition, to adjust said control mechanism to modify the condition of said operating medium to establish ignition conditions favorable to mixed ignition.

18. In combination, a constant volume explosion chamber of elongated form and provided with a conical inlet, a scavenging air valve positioned to charge scavenging air under pressure into said conical inlet, an outlet valve at the discharge end of the chamber, an externally controlled igniting element, control mechanism for operating said valves in a manner to cause scavenging air to be admitted when the pressure in the chamber, after opening of the outlet valve following an explosion when the pressure in the chamber has fallen to substantially the pressure of the scavenging air, said scavenging air thereby assuming the form of a piston and maintaining a relatively definite plane of division between itself and the retreating gases, said control mechanism being regulable to close the outlet valve prematurely to trap a portion of the residual gases, said residual gases transferring heat to the incoming charge and thereby preparing the latter for thermo-ignition, and means for automatically adjusting said control mechanism to regulate the amount of trapped residual gases so as to time the thermo-ignition caused by such gases relatively to the ignition by the externally controlled igniting element to produce mixed ignition, wherein one of said ignitions occurs during the course of the explosion initiated by the other mode of ignition.

19. Apparatus for controlling the ignition of a constant volume explosion chamber having an externally controlled igniter comprising, in combination, a timing shaft from which the operation of said igniter is controlled, mechanism operating to modify a factor contributing to the timing of the thermo-ignition point of the combustible charges introduced into the chamber, a source of regulating impulses for actuating said modifying mechanism, mechanism associated with the explosion chamber and responsive to the explosion pressures therein, and a control device actuated in synchronism with said timing shaft and cooperating with said responsive mechanism to bring into action or to suspend the action of said impulses in dependence upon the time relationship between the occurrence of a definite explosion pressure and the instant of operation of the externally controlled igniter to produce mixed ignition.

20. Apparatus according to claim 19, wherein the responsive mechanism includes a piston valve and a port controlled by such valve, a pipe for supplying pressure liquid to said port, said valve exposing said port when the predetermined explosion pressure occurs, a control conduit leading from said timed control device, said control device having a passageway controlling the communication between said conduit and port and determining, by the movement of such device, whether communication is to be established between the conduit and port, or not, in view of the time interval between the occurrence of the predetermined explosion pressure and the instant of operation of the external igniter.

21. Apparatus for controlling the ignition of a constant volume explosion chamber having an externally controlled igniter comprising, in combination, a timing shaft from which the operation of said igniter is controlled, mechanism operating to modify a factor contributing to the timing of the thermo-ignition point of the combustible charges introduced into the chamber, a source of regulating impulses for actuating said modifying mechanism, mechanism associated with the explosion chamber and responsive to the explosion pressures therein, and a control device actuated in synchronism with said timing shaft and cooperating with said responsive mechanism to bring into action or to suspend the action of said impulses in dependence upon the time relationship between the occurrence of a definite explosion pressure and the instant of operation of the externally controlled igniter to produce mixed ignition, said control device including movable means presenting to said regulating impulses periodically and at successive instants paths of different impulse transmitting capacity in accordance with the magnitude of the interval involved in said time relationship, so as to bring into action regulating forces of different degrees of influence upon the mechanism which modifies the factor contributing to the timing of the thermo-ignition point as said time relationship varies.

22. Apparatus for controlling the ignition of a constant volume explosion chamber having an externally controlled igniter comprising, in combination, a timing shaft from which the operation of said igniter is controlled, mechanism operating to modify a factor contributing to the timing of the thermo-ignition point of the combustible charges introduced into the chamber, a source of regulating impulses for actuating said modifying mechanism, mechanism associated with the exploson chamber and responsive to the explosion pressures therein, and a control device actuated in synchronism with said timing shaft and cooperating with said responsive mechanism to bring into action or to suspend the action of said impulses in dependence upon the time relationship between the occurrence of a definite explosion pressure and the instant of operation of the externally controlled igniter to produce mixed ignition, said control mechanism being constructed to determine the movement of the responsive mechanism to different positions upon the appearance of a predetermined explosion pressure, the strength of the regulating impulse being in turn determined by the position of said responsive mechanism.

23. Apparatus for controlling the ignition of a constant volume explosion chamber having an externally controlled igniter comprising, in combination, a timing shaft from which the operation of said igniter is controlled, mechanism operating to modify a factor contributing to the timing of the thermo-ignition point of the combustible charges introduced into the chamber, a source of regulating impulses for actuating said modifying mechanism, mechanism associated with the explosion chamber and responsive to the explosion pressures therein, and a control device actuated in synchronism with said timing shaft and cooperating with said responsive mechanism to bring into action or to suspend the action of said impulses in dependence upon the time relationship between the occurrence of a definite explosion pressure and the instant of operation of the externally controlled igniter to produce mixed ignition, said control mechanism being constructed to determine the movement of the responsive mechanism to different positions upon the appearance of a predetermined explosion pressure in correspondence with the time relationship between the appearance of such explosion pressure and the instant of external ignition, and causing displacement of the responsive mechanism into those positions in which regulating impulses of greater or less influence are brought into action upon the modifying mechanism.

24. In combination, a constant volume explosion chamber of elongated form and provided with a conical inlet, an air valve mechanism at the inlet end of the chamber, an outlet valve at the discharge end of the chamber, an externally controlled igniting element, controlling mechanism for operating the valves in a manner to cause air to be admitted after the expansion of an exploded charge out of the chamber, said control mechanism being regulable to close the outlet valve prematurely to trap a portion of the residual explosion gases, said residual gases transferring heat to the incoming charge and thereby preparing the latter for thermo-ignition, and means for automatically adjusting said control mechanism to regulate the amount of trapped residual gases and thereby time the thermo-ignition caused by such gases relatively to the instant of ignition by the externally controlled igniting element so as to produce mixed ignition, wherein one of said ignitions occurs during the course of the explosion initiated by the other ignition.

25. In combination, a constant volume explosion chamber having inlet mechanism for charging air and fuel into the chamber, an outlet mechanism for discharging the exploded mixture to a place of use, an externally controlled igniting element for effecting ignition of the combustible charge in the chamber at a controlled instant, mechanism responsive to changes in a physical condition brought about by the occurrence of an explosion in said chamber, and control mechanism, cooperating with said responsive mechanism to regulate the degree of heat transmitted to the combustible mixture in the chamber prior to the ignition so as to control the instant of thermo-ignition with reference to the instant of externally controlled ignition to produce mixed ignition, wherein one of said ignitions occurs during the course of the explosion initiated by the other mode of ignition.

26. In combination, a constant volume explosion chamber having inlet mechanism for charging air and fuel into the chamber, an outlet mechanism for discharging the exploded mixture to a place of use, an externally controlled igniting element for effecting ignition of the combustible charge in the chamber at a controlled instant, timing mechanism for the valves of the chamber and regulable to cause premature closing of the outlet valve following the discharge of an exploded mixture so as to trap a quantity of residual combustion gases in the chamber, said gases transferring heat to the next incoming combustible charge and raising the temperature thereof to the thermo-ignition point, and mechanism responsive to a change in a physical condition brought about by an explosion in the chamber in time relation to the instant of externally controlled ignition to effect adjustment of said timing mechanism and thereby regulate the amount of trapped gases to cause the explosion to be effected by mixed ignition, wherein one of said ignitions occurs during the course of explosion initiated by the other ignition.

27. In combination, a constant volume explosion chamber having inlet mechanism for charging air and fuel into the chamber, an outlet mechanism for discharging the exploded mixture to a place of use, an externally controlled igniting element for effecting ignition of the combustible charge in the chamber at a controlled instant, the combustible mixture entering the chamber receiving heat by radiation and conduction to such an extent that the thermo-ignition point is reached over an extensive area, mechanism for determining the condition of lag or lead of the thermo-ignition instant with reference to the externally controlled ignition instant, and mechanism controlled by the first mechanism and operating to cause increase or decrease of the degree of heat transmitted to the newly admitted explosive mixture as the thermo-ignition excessively lags or leads, respectively, the externally controlled ignition to maintain the condition of mixed ignition.

28. In combination, a constant volume explosion chamber having inlet mechanism for charging air and fuel into the chamber, an outlet mechanism for discharging the exploded mixture to a place of use, an externally controlled igniting element for effecting ignition of the combustible charge in the chamber at a controlled instant, a piston valve subjected to a substantially constant pressure at one side and to the chamber pressure at the other, a source of fluid pressure, apparatus adapted to be actuated by the pressure fluid for controlling the rate of temperature rise in the combustible mixture prior to the explosion and thus controlling the thermo-ignition instant, and a continuously operated control mechanism synchronized with the operation of the externally controlled igniter and co-operating with the piston valve to regulate the flow of pressure fluid to said apparatus in accordance with the time displacement of the thermo-ignition instant with reference to the externally controlled ignition instant to cause changing over from unitary to mixed ignition.

HANS HOLZWARTH.